(12) United States Patent  (10) Patent No.: US 8,144,182 B2
Shoemake et al.  (45) Date of Patent: Mar. 27, 2012

(54) REAL TIME VIDEO COMMUNICATIONS SYSTEM

(75) Inventors: Matthew B. Shoemake, Allen, TX (US); Nadeem Ahmed, Allen, TX (US)

(73) Assignee: Biscotti Inc., Allen, TX (US)

( * ) Notice: Subject to any disclaimer, the term of this patent is extended or adjusted under 35 U.S.C. 154(b) by 443 days.

(21) Appl. No.: 12/561,165

(22) Filed: Sep. 16, 2009

(65) Prior Publication Data

US 2010/0066804 A1  Mar. 18, 2010

Related U.S. Application Data

(60) Provisional application No. 61/097,379, filed on Sep. 16, 2008.

(51) Int. Cl.
*H04N 7/14*  (2006.01)

(52) U.S. Cl. ............... 348/14.04; 348/14.08; 348/14.09

(58) Field of Classification Search .... 348/14.01–14.02, 348/14.04–14.05, 14.08–14.09, 14.1, 14.12
See application file for complete search history.

(56) References Cited

U.S. PATENT DOCUMENTS 7,768,388 B2 * 8/2010 Putterman et al. ......... 348/14.04
8,063,929 B2 * 11/2011 Kurtz et al. ................ 348/14.08
* cited by examiner

*Primary Examiner* — Suhan Ni
(74) *Attorney, Agent, or Firm* — Swanson & Bratschun, L.L.C.

(57) ABSTRACT

Novel tools and techniques for providing video calling solutions. In some such solutions, a video calling device resides functionally inline between a set-top box and a television set. Such solutions can provide, in some cases, high performance video calling, high video quality, simplified installation, configuration and/or use, and/or the ability to enjoy video calling in an inclusive, comfortable environment, such as a family room, den, or media room.

86 Claims, 16 Drawing Sheets

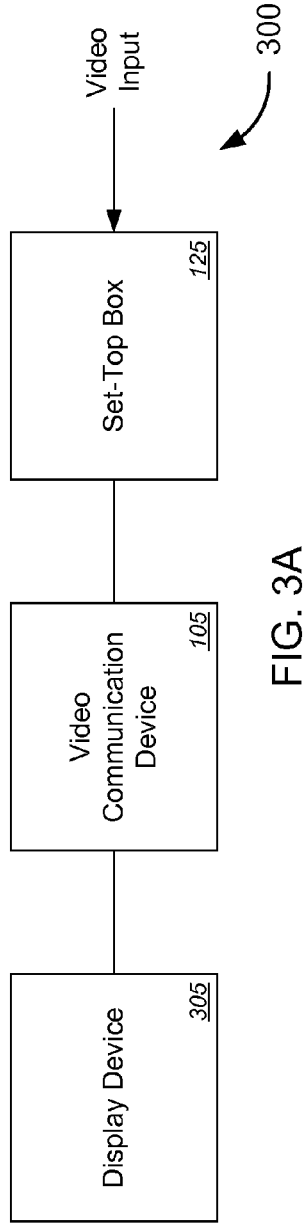
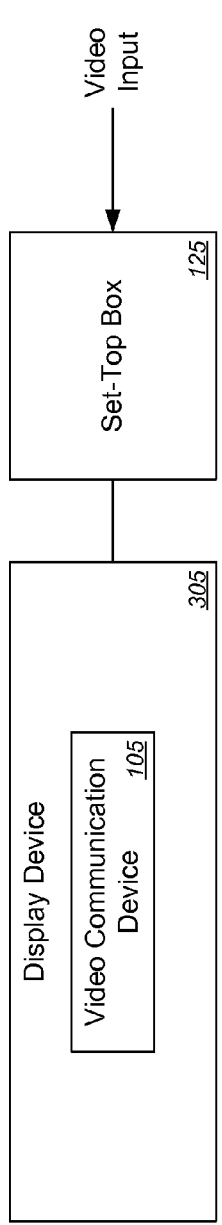
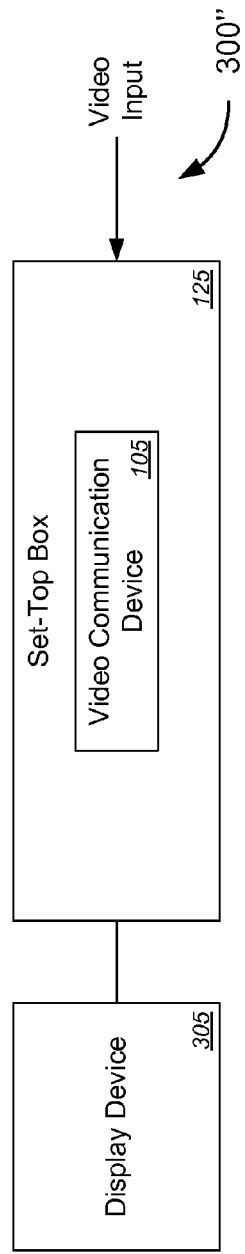
FIG. 3A
FIG. 3B
FIG. 3C

REAL TIME VIDEO COMMUNICATIONS SYSTEM

CROSS-REFERENCES TO RELATED APPLICATIONS

The present disclosure may be related to the following commonly assigned applications/patents:

This application claims priority from co-pending provisional U.S. Patent Application No. 61/097,379, entitled "Real Time Video Communications System" and filed Sep. 16, 2008 by Shoemake et al., which is hereby incorporated by reference, as if set forth in full in this document, for all purposes.

The respective disclosures of these applications/patents are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to video communications, and more particularly, to tools and techniques for providing video calling services.

BACKGROUND

Families and friends desire to see one another. We desire to be a part of one another's lives. Unfortunately, we are more geographically dispersed than ever. Thus, family and friends can not see each other as frequently as desired. This separation makes it more difficult to be a part of each others lives.

Video calling (also called video conferencing) is a promising technology to allow friends and family to interact both aurally and visually, even when far apart. Heretofore, however, there have been no satisfactory video calling options for consumers. There are professional-grade systems, such as those available from POLYCOM and others, but such professional-grade systems require complex hardware that is both prohibitively expensive and difficult to use.

At the other end of the spectrum lie solutions based on a personal computer ("PC"), such as web cams and video chat software available from SKYPE and others. While relatively inexpensive, however, such PC-based solutions have several shortcomings of their own. As an initial matter, the call quality of a video call using such solutions is far from optimal, and the software and hardware required to implement them can be confusing and error-prone. Perhaps more importantly, such solutions tether the user to a personal computer, which is often located in an office or study, and they generally, therefore, cannot provide an inclusive experience for an entire family.

Dedicated video phones provide another option, but they present their own problems. For example, video phones are typically expensive, a shortcoming that is exacerbated by the need to buy multiple, identical phones just to carry on a conversation. Further, video phones often operate over a standard POTS ("plain old telephone system") telephone line and have very small screens. As a result, video phones rarely offer satisfactory video call quality and, even more than PC-based systems, fail to provide an inclusive family video calling experience.

Thus, there is a need for a video calling solution that solves these and other deficiencies found in current products.

BRIEF SUMMARY

Various embodiments provide video calling solutions. In a set of embodiments, a video calling device resides functionally inline between a set-top box ("STB") and a television set. Such embodiments can provide multiple benefits over prior solutions. Merely by way of example, as described in further detail below, certain embodiments provide high performance, high-definition video quality, simplified installation, configuration and/or use, and/or the ability to enjoy video calling in an inclusive, comfortable environment, such as a family room, den, or media room.

The tools provided by various embodiments include, without limitation, methods, systems, and/or software products. For instance, a method might comprise one or more procedures, any or all of which are executed by a video communication device and/or a computer system. Correspondingly, an embodiment might provide a video communication device and/or a computer system (which could be included in a video communication device) configured with instructions to perform one or more procedures in accordance with methods provided by various other embodiments. Similarly, a computer program might comprise a set of instructions that are executable by a video communication device and/or a computer system (and/or a processor therein) to perform such operations. In many cases, such software programs are encoded on physical and/or tangible computer readable media (such as, to name but a few examples, random access memory (e.g., dynamic RAM, flash RAM, etc.) read-only memory, optical media, magnetic media, and/or the like).

Merely by way of example, a video communication system in accordance with one set of embodiments comprises a video communication device. In one embodiment, the video communication device comprises a video input interface to receive video input from a set-top box and an audio input interface to receive audio input from the set-top box. In an aspect of some embodiments, these interfaces may be integrated, for example, in a high-definition multimedia interface ("HDMI"). In some cases, the audio input and the video input (which can be considered, in an aspect, a combined audiovisual stream) might comprise broadcast television programming, televised sporting events, movies, etc. and/or might be received from a satellite television provider, a cable television provider, and/or the like.

In another embodiment, the video communication device comprises an audio output interface and/or a video output interface (which, again, might be incorporated into an audiovisual interface, such as an HDMI interface), to provide audio and video output, respectively. In some cases, these interfaces might be configured to provide a high-definition audiovisual stream (e.g., comprising a video stream with a resolution of 480p, 720p, 1080i, 1080p, etc.) for display on a high-definition television.

The video communication device might further comprise a video capture device (of which a high-definition video camera is but one example) to capture a captured video stream and/or an audio capture device (of which a microphone or microphone array might be examples) to capture a captured audio stream. In some embodiments, the video communication device further comprises a network interface (which might be a WLAN interface in some cases). The video communication device might further include one or more processors. In particular embodiments, the video communication device might include two processors; a first processor might process audio and/or video captured by the video communication device, while a second processor might process video and/or audio received via the network interface and/or the audio/video input interface(s).

In an aspect, the video communication device also includes a storage medium (e.g., a hard drive, DRAM, flash RAM, etc.) on which is encoded (perhaps among other data) instructions executable by the processor(s) to control operation of the video communication device. These instructions might include, merely by way of example, instructions for controlling the video capture device to capture a captured video stream, and/or instructions for controlling the audio capture device to capture a captured audio stream. Further instructions might be executable by the processor(s) to encode the captured video stream and/or the captured audio stream to produce a series of packets, and/or instructions for transmitting the series of packets on the network interface for reception by another video communication device. This other video communication device might have a similar configuration, and/or it might be configured differently (for example, the second video communication device might be a PC programmed with a video chat application).

Another set of embodiments, as noted above, provides methods. An exemplary method is a method of providing video calling using a video communication device. The video communication device might comprise an audio capture device, a video capture device, a network interface, an audiovisual input interface, and/or an audiovisual output interface.

The method, in accordance with one embodiment, comprises receiving, on the audiovisual input interface, a set-top box audiovisual stream from a set-top box. In an aspect, the set-top box audiovisual stream might comprise a set-top box video stream and a set-top box audio stream. The method might also comprise receiving, on the network interface, a remote audiovisual stream via a network connection with a second video communication device. In an aspect, the remote audiovisual stream might comprise a remote audio stream and a remote video stream. In some embodiments, the method further comprises transmitting, on the audiovisual output interface, a consolidated output video stream comprising at least a portion of the remote video stream and a consolidated output audio stream comprising at least the remote audio stream.

The method might further comprise capturing a captured video stream with the video capture device and/or capturing a captured audio stream with the audio capture device. The captured video stream and/or the captured audio stream might be encoded to produce a series of data packets. The method, then, might comprise transmitting the series of data packets on the network interface for reception by the second video communication device.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A-3C illustrate alternative functional arrangements of a video communication device within a home entertainment system, in accordance with various embodiments.

DETAILED DESCRIPTION OF CERTAIN EMBODIMENTS

Figure 1A:
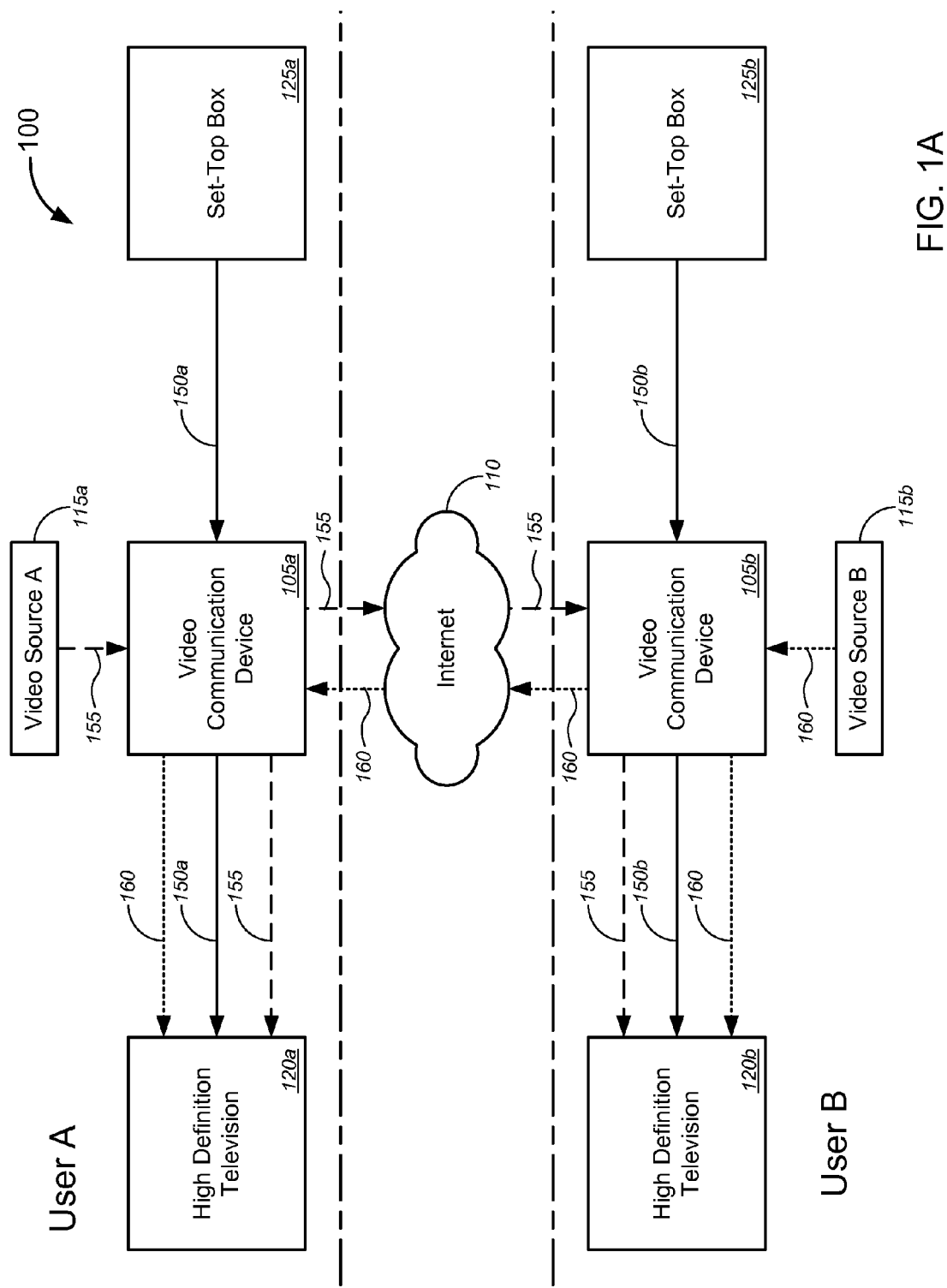
FIGS. 1A and 1B are functional diagrams illustrating video communication systems, in accordance with various embodiments.

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Various embodiments provide video calling solutions. In a set of embodiments, a video calling device resides functionally inline between a set-top box ("STB") and a television set. Such embodiments can provide multiple benefits over prior solutions. Merely by way of example, a video calling device in accordance with these embodiments can be implemented in the context of a family's home entertainment system, in a living room den, or the like, and therefore can provide an immersive experience for multiple users, in a roomy, comfortable setting. This implementation can allow, for example, all of the children in a family to talk to their grandparents at the same time, and each end of the video call can enjoy a large-screen, high-quality video image.

Moreover, with a video communication device situated functionally inline between a STB and a television screen, certain embodiments enable many enhanced features. For example, a user watching television can be notified immediately of an incoming video call, and the video communication device can seamlessly transition from normal television viewing to a video call. Moreover, in some embodiments, video calling can be integrated with television viewing, which can allow users to watch television collaboratively, even when far apart. Merely by way of example, two friends in different cities can watch the same football game, cheering (or commiserating) together as if they were in the same room. To enhance this experience, certain embodiments can display both the television signal from the STB and the other party to the video call simultaneously, using a split screen format, a picture-in-picture format, and/or the like.

Other embodiments can provide an enhanced user experience by reducing the complexity of installation and/or configuration. For instance, certain embodiments are configured as an integrated unit that can be placed on top of, below, or alongside a television screen. This configuration minimizes the complexity of installation tasks, which may be limited to connecting video and audio input and output cables and establishing a network connection (which may be provided by an integrated wireless local area network ("WLAN") transceiver in the video communication device. Moreover, installation and configuration options can be set using easy-to-understand menu system that is displayed on the television.

FIG. 1A illustrates a video communication system 100 in accordance with one set of embodiments. The system 100 comprises two video communication devices 105, examples of which are described in detail below. The video communication devices 105 have a network connection over the Internet 110 (although other networks can be used as well). Several examples of the operation of a video communication system such as the system 100 are described in detail below, but FIG. 1A illustrates a general mode of operation in accordance with one set of embodiments.

As illustrated by FIG. 1A, one of the video communication device 105a captures a video stream 155 from a first video source 115a (which might be a user, etc.). Although not shown in FIG. 1A, the video source 115a might also serve as an audio source for the video communication device 105a. Similarly, the second video communication device 105b captures a video (and/or audio) stream 160 from a second video source 115b. Each video communication device 105 is configured to transmit an output video stream to a display device 120; in the illustrated embodiment, the display devices 120 are high definition televisions ("HDTVs"), although other types of display devices may be used as well.

The output video stream transmitted by a video communication device 105 can have a varied composition. Merely by way of example, a video communication device 105a might be situated inline between a set-top box ("STB") 125a and the display device 120a, such that the video communication device 105a can pass through an audiovisual stream 150a (which might comprise a high-definition video stream) for display on the display device 120a. Alternatively and/or additionally, the video communication device 105a might receive the audio/video stream 160 captured and transmitted by the other video communication device 105b (for example, as part of a video call), and this stream 160 can be output for display on the display device. Similarly and/or additionally, the audio/video stream 155 captured by the video communication device 105a can be output for display on the display device 120a. (Likewise, the video communication device 105a might transmit its captured audio/video stream 155 to the other video communication device 105b, which could then output that stream 155 for display on its own display device 120b).

In some cases, a video communication device 105a may be configured to display the audiovisual stream 150a from the STB 125a simultaneously with the stream 160 received from another video communication device 105b, and/or along with the stream 155 it captures itself. In this way, the system 100 can provide a video calling environment that allows a user to both watch television and participate in a video call.

Figure 1B:
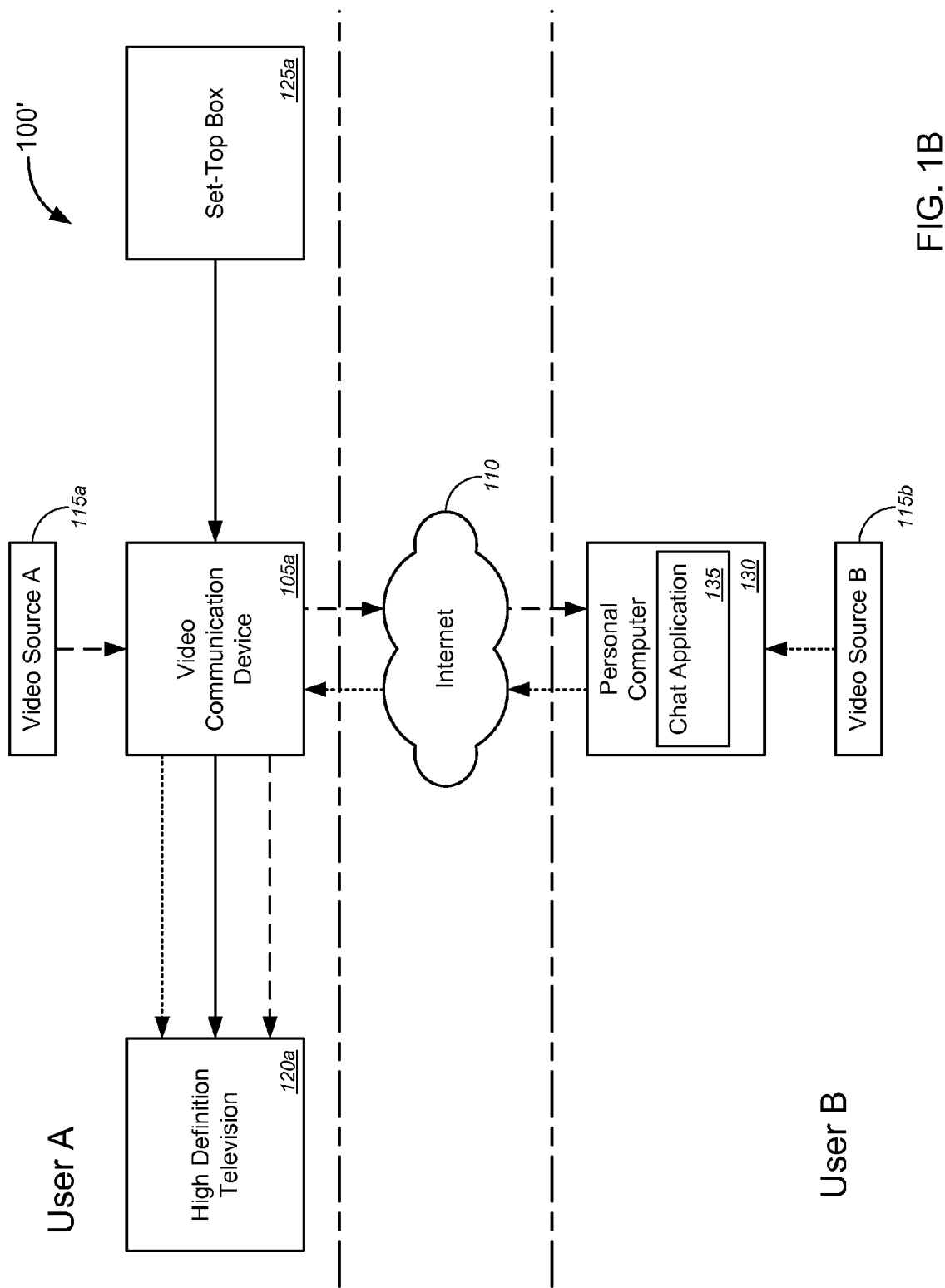

While FIG. 1A illustrates a video call between two similarly-configured video communication devices 105, it should be appreciated that other implementations are possible as well. Merely by way of example, FIG. 1B illustrates a similar system 100', in which a video communication device 105a can participate in a video call with a personal computer 130 programmed with a chat application 135, such as SKYPE, MSN MESSENGER, and/or the like. (It should be appreciated, of course, that a chat application 135 on a personal computer 130 may not offer the functionality of a video communication device 105 configured according to various embodiments discussed herein; nonetheless, in some embodiments, as illustrated by FIG. 1B, a video communication device 105 can provide cross-platform video calling functionality with a variety of other video calling solutions.) Similarly, while FIGS. 1A and 1B depict a video call involving two participants, other embodiments can support video conferencing involving three or more participating video communication devices.

Figure 2:
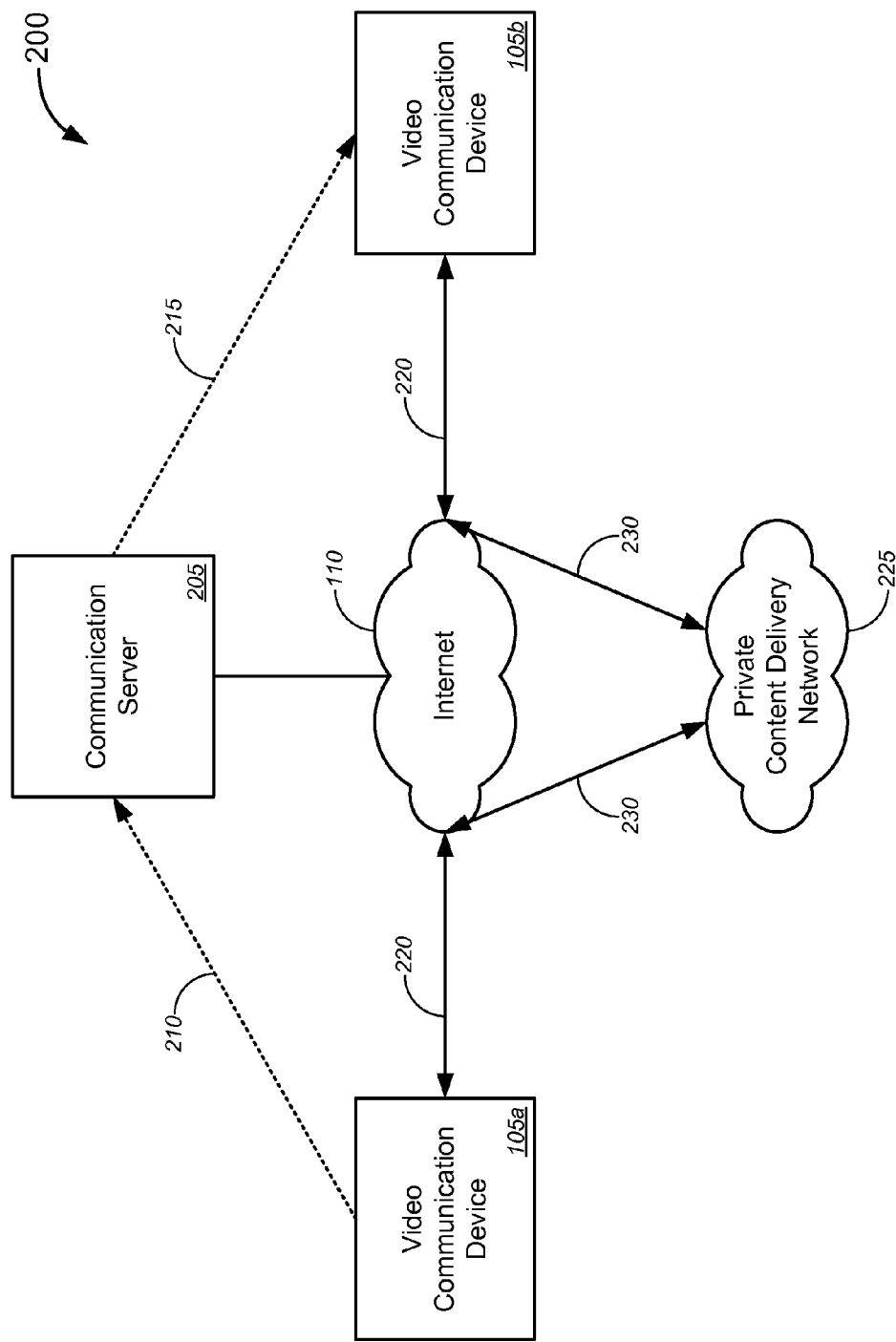
FIG. 2 is a block diagram illustrating a communication path of a video call, in accordance with various embodiments.

FIG. 2 illustrates a communication path 200 of a video call between two video communication devices 105, in accordance with one set of embodiments. The illustrated embodiment features a communication server 205, which can serve as an intermediary to assist in the negotiation of a connection between a first video communication device 105a and a second video communication device 105b. The communication server 205, in an aspect, is responsible for administering identifiers for various video communication devices 105 and/or for providing information to facilitate the connection of one video communication device 105a with another 105b, typically for the purpose of conducting a video call. In a set of embodiments, the communication server 205 communicates with the video communication devices 105 over the Internet.

In an aspect, certain embodiments employ the communication server 205 to provide identification and/or authentication services to facilitate video calls. Merely by way of example, the communication server 205 might be configured to assign identifiers to each of the video communication devices 105 that participate in the video communication system 200. In an aspect, these identifiers may be part of a sparse set, so that it is difficult for an illegitimate user to guess the identifier of a video communication device 105, preventing unauthorized and/or unwanted connections with a user's video communication device.

For example, in some embodiments, two users may not communicate with each other unless authenticated by the communication server 205. Each user must have a unique identification, which may be referred to as a key or an identifier. For two users to authenticate, one must know the key of the other. This key must be communicated by some out-of-band means, e.g. by e-mail, verbally, etc. Let's assume that User A knows the key of User B. User A then can send a request to User B to authenticate. The request includes the key of User A. User B accepts or declines the request. If User B accepts the request, the key of User A is automatically stored locally (at the video communication device of User B), so User B can place calls at a later time. Additionally, a message may be sent from User B to User A that conveys the acceptance of the request. User A can then add the key of User B to its list of available users to call.

To minimize the chance of random calls or connection requests, the likelihood of selecting a random key that corresponds to a real user should be low. Thus, keys are selected randomly from a large set of potential sequence (i.e., a sparse set). In conjunction with the authentication/connection techniques employed by the server 205 in various embodiments, this technique achieves the goal of a simple connection protocol that also has low probability of unsolicited calls.

These identifiers (keys) may also be stored at the communication server 205. Additionally and/or alternatively, the communication server 205 may store connection information for each video communication device 105, including without limitation addressing information (e.g., IP address, etc.) for each video communication device 105, biographical and or demographic information about a user and/or owner of each video communication device 105, and/or the like.

Hence, when the user of one video communication device 105a wishes to contact the user of another video communication device 105b, the communication server 205 can facilitate the connection, e.g. through provision of connection information to enable the two video communication devices 105 to communicate. (Of course, in order to maintain privacy and our security of each user and/or video communication device 105, the communication server 205 may be configured to first identify and authenticate the video communication device 105 requesting the connection, as described above). Hence the communication server 205 can provide low-overhead call control (setup and teardown) while allowing the call itself to proceed on a peer-to-peer basis. This method is very transactional and does not rely on heavy data movement at the communication server 205; this model therefore does not impose heavy bandwidth or storage costs on an operator of the server 205 and can allow for creative business models, such as a model that does not charge users any incremental cost for video calls.

In the illustrated embodiment, for example, a user of a video communication device 105a might wish to engage in a video call with a user of a second video communication device 105b. The user provides user input to the video communication device 105a instructing that device 105a to request a connection with the target video communication device 105b. In response to this user input, the requesting video communication device 105a transmits a connection request 210 (typically over the Internet) for reception by the communication server 210. The communication server 205, after performing any necessary identification and/or authentication, forwards (typically over the Internet) the connection request 215 (and/or any other information identifying the requesting video communication device 105a and/or its user) to the target video communication device 105b. A user of the target video communication device 105b then can decide whether to accept the connection request. If the request is accepted, the communication server 205 then can provide any necessary addressing (or other) information to allow the two video communication devices 105 to establish a video call.

In an aspect of certain embodiments, however, the video call itself is made over a peer-to-peer connection between the two video communication devices 105. In other words, the data path for the video call need not be routed through the communication server 205. Rather the first video communication device 105a and the second video communication device 105b can establish a video call 220 directly with one another over the Internet. This arrangement prevents the communication server 205 from imposing a bottleneck on the transmissions between the two video communication devices 105 yet still impose access control to ensure the privacy and security of each of the video communication devices 105 (and their users).

Alternatively and/or additionally, in some embodiments, the communication server 205 might provide connection information to enable the video communication devices 105 to establish a video call 230 over a private content delivery network ("CDN") 225, such as those provided by LEVEL 3 COMMUNICATIONS, LIMELIGHT NETWORKS, AMAZON CLOUDFRONT, AKAMAI TECHNOLOGIES, and others. While CDNs traditionally are used for delivering streaming media and other high-bandwidth applications from web servers, CDNs can also provide high-bandwidth connections to provide a high-performance network to enable to video communication devices 105 to establish a video call. Because the server 205 has the capability to route calls either over the Internet or over a CDN, calls can be routed to the CDN (which typically costs money to use) only as needed. In an aspect, the server 205 may also have the ability to allow only authorized users (e.g., purchasers of a premium account with the video calling provider) to have access to the CDN, which is again useful from a cost perspective. Thus, in an aspect, routing a video call through a CDN might be provided as a value-added service by an video calling provider. It should be noted, of course, that a typical CDN does not provide end-to-end network coverage for both of the video communication devices 105, and that intermediate hops between a video communication device 105 and a CDN 225 may be carried by the user's Internet Service Provider. (In that sense, FIG. 2 should be considered conceptual in nature, and the reader should appreciate that, in the interest of simplicity, not every network link involved in a typical video call is illustrated by FIG. 2.)

In some embodiments, the communication server 205, in addition to user/video communication device identification/authentication, and connection setup, may also perform other functions, including assisting in punch-through for users behind hardware firewalls/routers that implement network address translation ("NAT") to enable peer-to-peer communication between video communication devices that are behind NAT-based firewalls. A firewall is a device that protects home networks from malicious attacks over the Internet. NAT is a mechanism in which the address used on the local network is translated into one that is meaningful on the Internet. The use of NATs results in the external address of a machine behind the NAT being different than the internal address of the machine. Peer-to-Peer communications for devices behind NATs/firewalls is challenging because neither machine knows its external address, which is needed to establish communication with the other machine, and/or because firewalls need to be traversed. The call setup services provided by the communication server 205 can communicate between video communication devices despite such NATs and firewalls. As a simple example (although more complex techniques are available as well), the communication server 205 and/or another server in communication therewith, might periodically receive, from each video communication device, a message including the device's identifier. The server can use this identifier, along with information about the routing of the message (e.g., the source address of the message, which typically will be the NAT's external address) to maintain a set of punch-through information that can allow the video communication device to be located when the communication server needs to set up a video call.

The communication server 205 may also provide routing of traffic to storage sites. This can enable users to share their personal videos with others (e.g., by uploading videos through the communication server 205 for later download to a different video communication device, for access through a web site in communication with the communication server 205, etc.).

As noted above, in an aspect of some embodiments, a video communication device is situated functionally inline between a STB and a display device; this configuration can provide many advantages. By "functionally inline," we mean that the functionality of the video communication device logically is disposed between the STB and the display device. As described herein, a STB is any device that can provide video tuning, decryption and/or decoding functionality, especially as that functionality relates to reception of broadcast, cable, and/or satellite television signals. Hence, when situated functionally inline between a STB and a display device, the video communication device can receive an audiovisual stream output from the STB, modify that audiovisual stream in accordance with the methods described herein, and provide the (perhaps modified) audiovisual stream as input to the display device.

This functionality, however, should not be taken to mean that the video communication device necessarily must be a separate device from either the STB or the display device. Merely by way of example, FIGS. 3A-C illustrate several possible configurations in accordance with various embodiments, in which the video communication device is functionally inline between the STB and the display device. In the system 300 of FIG. 3A, the video communication device 105 is configured as a standalone device that receive input from a STB 125 and provides output to a display device 305. Alternatively, as illustrated by the system 300' FIG. 3B, the video communication device 105 (and/or the functionality thereof) might be incorporated within the display device 305. Similarly, as illustrated by the system 300" of FIG. 3C, the video communication device 105 (and/or the functionality thereof) may be incorporated by the STB 125, and/or, in the alternative, the video communication device 105 might provide the functionality, including without limitation, tuning decryption, and/or decoding, typically provided by a traditional STB. (Merely by way of example, a video communication device 105 might be configured to support the use of a CABLECARD to enable the video communication device 105 to act as a cable television receiver.) In each of these arrangements, however, the video communication device 105 can still be considered to be functionally inline between the STB 125 and the display device 305.

Figure 4:
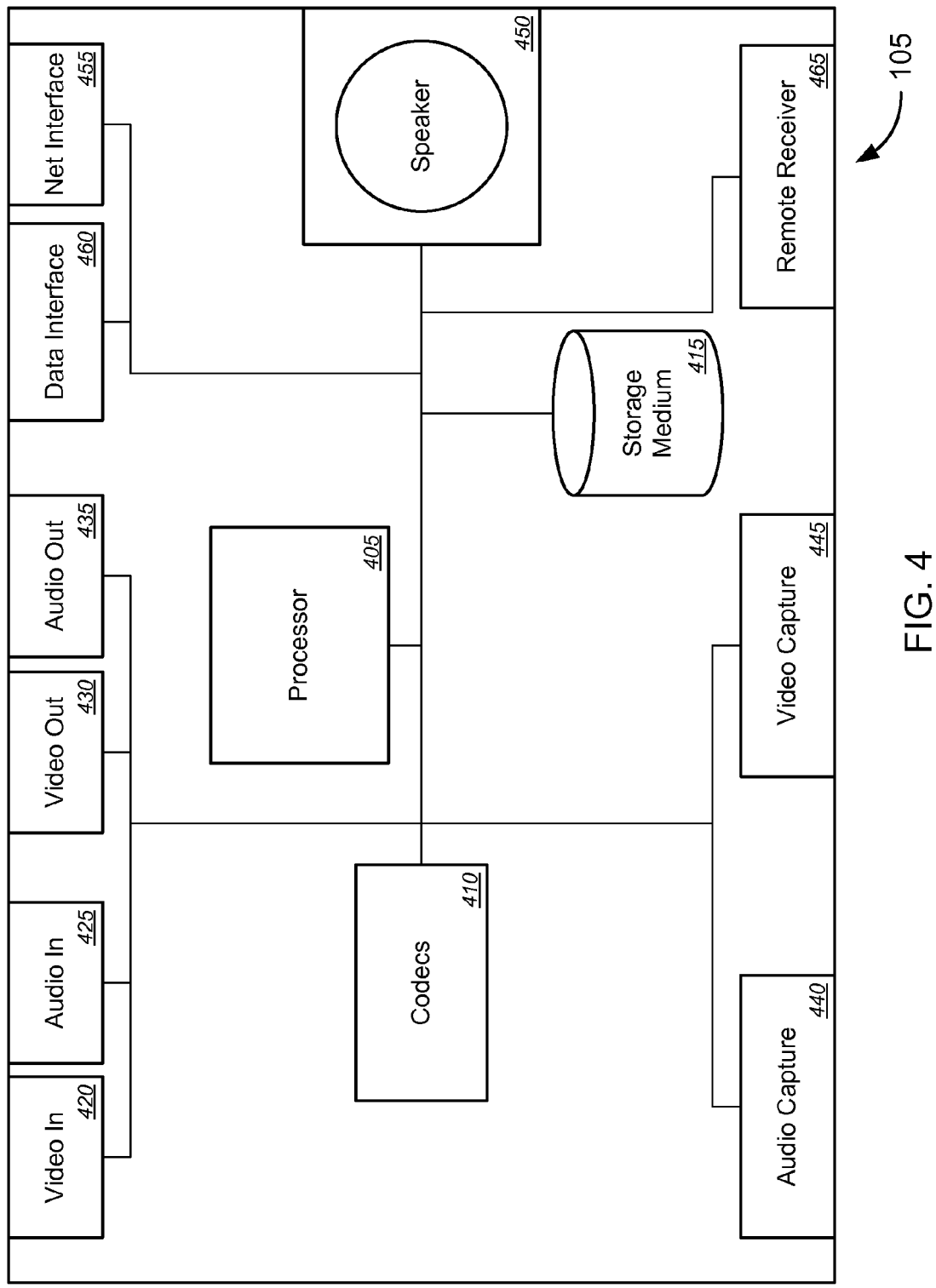
FIGS. 4 and 5 are simplified schematic diagrams illustrating video communication devices, in accordance with various embodiments.

FIG. 4 is a block diagram illustrating the components of a video communication device 105 in accordance with one set of embodiments. (It should be appreciated, of course, that the arrangement of the components is provided illustrative purposes only, and that components can be added, subtracted, or arranged as appropriate.). The video communication device 105 includes a processor 405 that acts generally to control the operation of the video communication device 105. In some cases, the processor might be a dedicated video processor and/or digital signal processor ("DSP"). Merely by way of example, the DM365 digital media processor from TEXAS INSTRUMENTS may be used as the processor 405 in one embodiment. Other embodiments might feature multiple processors, such as a general purpose processor for overall control operations and a DSP for media transcoding and processing operations, multiple general purpose processors, and/or multiple DSPs to handle different media streams (e.g., one DSP to process/decode incoming audiovisual streams and another DSP to process/encode media streams captured by the video communication device 105). The video communication device 105 might also include one or more audio and/or video codecs 410 to provide encoding and/or decoding functionality, as well as one or more storage media 415 that can be encoded with instructions executable by the processor, can provide working memory for execution of those instructions, can be used to cache and/or buffer media streams, and/or the like.

The video communication device 105 of FIG. 4 also includes an input video interface 420 and an input audio interface 425, as well as an output video interface 430 and an output audio interface 435. Each of these interfaces may be implemented as an analog interface and/or a digital interface. Merely by way of example, the input audio interface 425 and/or output audio interface 435 may comprise a set of RCA analog jacks, a fiber optic and/or coaxial digital interface and/or the like. Similarly the input video interface 420 and/or output video interface 430 may be implemented as an analog composite, component, S-video, and/or VGA interface, and/or as a digital component interface and/or digital visual interface ("DVI"). In some cases the input audio interface 425 and the input digital interface 420 (and/or the output audio 435 and video 430 interfaces) may be incorporated by a single audiovisual interface, such as an HDMI interface. In many cases, multiple interfaces (e.g., an HDMI interface and a set of analog interfaces) may be provided for input and/or output. In other cases, separate audio and video interfaces can be combined into an integrated interface (e.g., an interface that provides analog audio input and composite or component video input) to reduce the footprint of the interface on the case of the video communication device 105; in such cases, a breakout cable may be provided to convert this integrated interface into separate interfaces with appropriate connections (e.g., stereo RCA connectors for audio and a composite or component video connector for video) to which cables can be attached for connectivity with external devices such as an STB, display device, and/or the like.

In an aspect, the input audio interface 425 is configured to receive an audio stream (referred to herein as a "STB audio stream") from a STB, and the input video interface 420 is configured to receive a video stream (referred to herein as a "STB video stream") from a STB. Together, the STB audio stream and the STB video stream (which typically are synchronized and/or provided together as a single media stream) can be considered a "STB audiovisual stream," which might comprise programming (television programming, sports, movies, etc.) provided by a cable or satellite provider, or received over the air.

Likewise, the output audio interface 435 is configured to transmit an output audio stream (which may be a consolidated output audio stream, as described later) for reception by an attached external audio receiver, which might be a standalone device configured to power a set of external speakers and/or might be incorporated within a display device. The output video interface 430 is configured to transmit an output video stream (which may be a consolidated video output stream, as described later) for reception by an attached display device.

Together, the output audio stream and the output video stream can be considered an output audiovisual stream.

The video communication device 105 of FIG. 4 further comprises an audio capture device 440 (which might be a microphone, array of microphones, etc.) to capture an audio stream (referred to herein as a "captured audio stream"), which might include, without limitation, speech from a user participating in a video call, as well as a video capture device 445 (which might be a video camera, etc.) to capture a video stream (referred to herein as a "captured video stream"), which might be video footage of a user participating in a video call, to name one example.

In some embodiments, the video communication device 105 also includes a speaker 450, which can be used to play sound produced by the video communication device 105, including the contents of an output audio stream, especially in the case in which an external audio receiver is not enabled (e.g., not attached, not powered on, or is not configured) to play audio received from the video communication device 105. As described below, in some cases, the processor 405 may be programmed to detect whether an audio receiver is enabled to play audio received from the video communication device 105 and to control operation of the speaker 450 accordingly.

The video communication device 105 of FIG. 4 further includes a network interface 455, which can be used to provide connectivity with a LAN (and accordingly, the Internet and/or a CDN through a connection between the LAN and the ISP, or directly), and through such connectivity, to communicate with a communication server and/or another video communication device. In particular, the network interface 455 may be used to receive an encoded audio and/or video stream (described herein as a "remote audio stream," and a "remote video stream," respectively) from another video communication device. (These streams, like the other audio and video streams described herein, may be considered together to be a "remote audiovisual" stream). The network interface 455 may further be used to transmit audio and/or video streams captured and/or encoded by the video communication device 105 for reception by another video communication device. Through the reception and transmission of these streams, the network interface 455 can provide connectivity to support a video call. The network interface 455 may be used for other communications as well, for example, to send or receive data to/from a communication server (or other device); such data can include, without limitation, demographic information, data about viewing habits, relevant advertisements, stored media files, and/or the like.

The video communication device 105 might also include a data interface 460, which can be used to attach a media storage device, such as a camera (video or still), audio player, personal digital assistant, hard drive, flash drive, and/or the like. The data interface therefore can be used by the video communication device 105 to obtain media files for transmission to other devices, to provide additional storage for media, and/or the like.

In some embodiments, the video communication device 105 includes a remote control receiver 465 for receiving signals from a remote control (not pictured) to control operation of the video communication device 105 and/or any attached devices that are capable of such control (through techniques such as an infra-red relay, through an HDMI connection, and/or the like). In an embodiment, the remote control receiver 465 might be configured to receive infra-red signals (e.g., according to the IrDA standard), to receive radio frequency ("RF") signals, BLUETOOTH signals, and/or the like. In some cases, the remote control may be used to control operation of a remote video communication device participating in a video call with the video communication device 105. Merely by way of example, the remote control may be used to control a field of view of a camera in (or controlled by) the remote video communication device, as described in further detail below.

As illustrated by FIG. 4 all of the components of the video communication device 105 are integrated within a unified housing, such that the video communication device 105 can be implemented as a single device to be connected with a STB and a display device. As noted above, this configuration may be beneficial in certain situations, because it can provide an enhanced user experience by minimizing the number of cables, as well as the complexity of installation, configuration, and management of the video communication device 105. It should be noted, however, that in other embodiments, certain components may be external to the video communication device 105 and/or in communication with the video communication device 105 via any appropriate (wired or wireless) connection. Merely by way of example, in some cases, the video capture device 445 and/or the audio capture device 445 might be external to the video communication device 105, which can allow increased flexibility in the placement of those devices.

In an aspect of certain embodiments, the video communication device 105 is configured to provide high-performance video encoding and decoding operations to enhance the visual quality of a video call. Merely by way of example, in some implementations, the processor 405 provides dynamic control over the codecs 410 to adapt to varying network conditions, allowing the maintenance of high-quality video even under suboptimal network conditions. For instance, the video communication device 105 may be configured to monitor the network condition on the local network and/or compile key statistics such as throughput, latency, jitter, and packet loss. Additionally, encoded packets received by the video communication device 105 from the network may contain time-stamps, which can be used by algorithms running on the processor 405 to determine overall latency and jitter. Packet sequence numbers and packet size information can be used to determine overall network packet loss and throughput. This information can then be fed back to the transmitting video communication device, allowing it to adjust its encoding and/or transmission settings. Similarly, the processor 405 may be configured to adaptively adjust the video bit-rate, video frame-rate and/or video resolution, based on the network conditions determined using locally generated statistics and those fed-back by the remote video communication device.

In some cases, the processor 405 implements motion quantity estimation, which can be a key input in controlling the video frame-rate. Videos with a high degree of motion require larger frame rates for high quality, while those with less motion can tolerate lower frame rates. Therefore, the amount of motion is a key input parameter in jointly determining the best settings for video resolution, frame rate and bit-rate. The processor 405, in certain embodiments, examines the encoded video frames and estimates the amount of motion present in the video stream.

Often, audio and video encoders have differing latencies. Additionally, a remote video communication device often packetizes audio and video packets separately. Therefore, the remote audio and video streams have the potential to become desynchronized when they arrive at the video communication device 105. To compensate, the processor 405 may implement control algorithms using time-stamp information within the packets re-synchronize the audio and video streams prior to output to the HDTV. In addition and/or alternatively, the system may implement jitter buffer at the video communication device 105 to remove jitter that is introduced by the network and to provide a steady stream of data to the video decoder.

On the transmission side, optimized network management, encoding and packetization of the captured audio and video streams is a key method of enabling quality of service. The processor 405 may implement techniques enable high-quality video to be maintained even when the network link between the video communication devices degrades. Merely by way of example, in most cases, not all of the data encoded by the video codec is of equal importance when reconstructing the video stream. Some data is extremely important and its loss or corruption can severely degrade the reconstructed (depacketized and decoded) video stream, while the reconstructed video stream may be more robust to loss of other data. Accordingly, the processor 405 may be configured to separate the video encoder output into N streams. The most important stream, stream 1, has highest priority, while the least important stream, stream N, has the lowest. Likewise, scheduling of packet transmission and retransmission may be optimized to maintain quality of service. The processor 405, therefore, may be configured to schedule packets based on their priority, and therefore importance to in reconstructing video at the remote video communication device. The packet scheduler uses the state of the local network, feedback from the remote video communication device, and the state of priority queues to determine which packet to (re)transmit next. The objective of the scheduler is to provide high-quality, low-latency video to the remote video communication device, while at the same time providing "fairness" to other, non-video call, traffic that may be on the network.

Another aspect provided by certain embodiments is the implementation of a friendly user interface, which might be provided through the display device and/or a remote control. For example, when a video call is received, the user interface might overlay a notification over any television programming that the user is currently viewing. This notification may provide an identification of the calling party, as well as any other provided information (e.g., sound clips and/or video clips provided by the calling party, etc.)

In some embodiments, when the user wishes to initiate a video call, the user is provided with an easy to navigate menuing system on the display device. In an aspect, this system is specifically designed for navigation by the supplied remote control. Merely by way of example, in one embodiment, the system allows the user to navigate a list of contacts list by scrolling to the letter of the alphabet that has the recipients name and then to scroll down to that person's name. When the call is initiated and the caller is waiting for an answer, another intermediary screen may be displayed, illustrating the caller and recipient. When the call is answered, the recipient of the call is displayed on the display device (in some cases alongside the television programming the user was previously viewing, using an allocation scheme specified by the video communication device 105 based on user settings and/or other configuration parameters).

Figure 5:
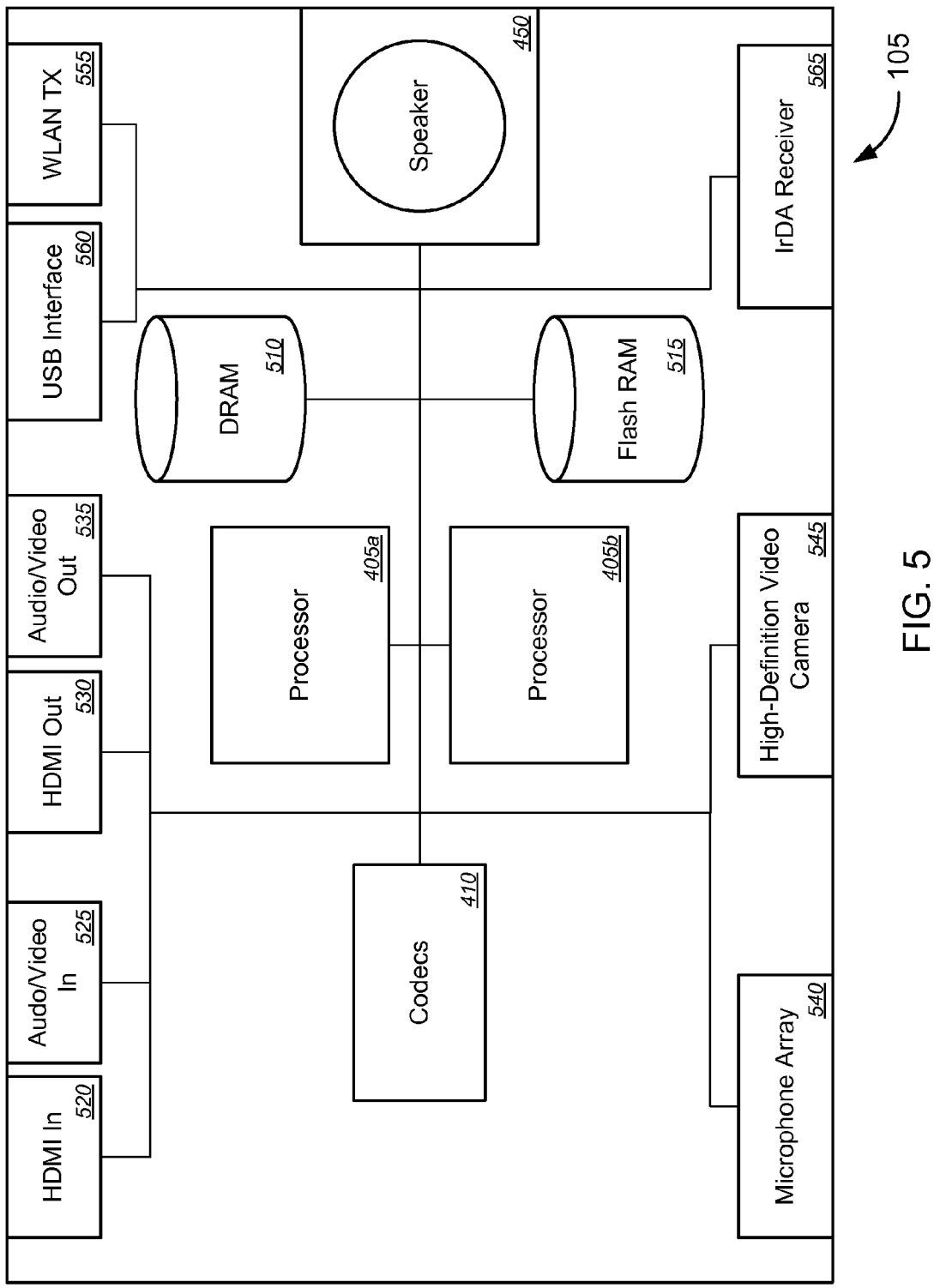

FIG. 5 illustrates a video communication device 105 in accordance with another set of embodiments. The video communication device of FIG. 5 is architecturally similar to that of the video communication device of FIG. 4. FIG. 5, however, illustrates a set of components featured by a configuration in a particular embodiment and can be considered a more specific illustration of that embodiment, whereas FIG. 4 is more general in nature. Specifically, the video communication device 105 of FIG. 5 features two processors 405 (which may or may not be the same type of processor), and storage is provide by DRAM 510 (for working memory) and flash RAM 515 (for persistent storage of the software with which the processors 405 are programmed). In the video communication device of FIG. 5, the audio capture device comprises a microphone array 540 with one or more microphones (which can provide stereo audio input, in some cases), and the video capture device comprises a high-definition video camera 545.

The video communication device 105 of FIG. 5 also includes both HDMI input 520 and output 530 interfaces as well as a set of analog audio and video interfaces 525, 535 for input and output, respectively. The HDMI input interface 520 may be configured to receive a high-definition audiovisual input from the STB, while the HDMI output interface 530 may be configured to provide high-definition audiovisual output for display on a HTDV. In the illustrated embodiment, the network interface comprises a WLAN transceiver 555, and the data interface comprises by a USB interface 560. The remote control receiver is an IrDA-compatible receiver 565.

FIGS. 6-10 and 12-13 illustrate various methods that can be used to provide and/or enhance video calling functionality. While the methods of FIGS. 6-10 and 12-13 are illustrated, for ease of description, as different methods, it should be appreciated that the various techniques and procedures of these methods can be combined in any suitable fashion, and that, in some embodiments, the methods depicted by FIGS. 6-10 and 12-13 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 6-10 and 12-13 can be implemented by (and, in some cases, are described below with respect to) the system 100 of FIG. 1 (or components thereof), these methods may also be implemented using any suitable hardware implementation. Similarly, while the system 100 of FIG. 1 (and/or components thereof) can operate according to the methods illustrated by FIGS. 6-10 and 12-13 (e.g., by executing instructions embodied on a computer readable medium), the system 100 can also operate according to other modes of operation and/or perform other suitable procedures.

Figure 6:
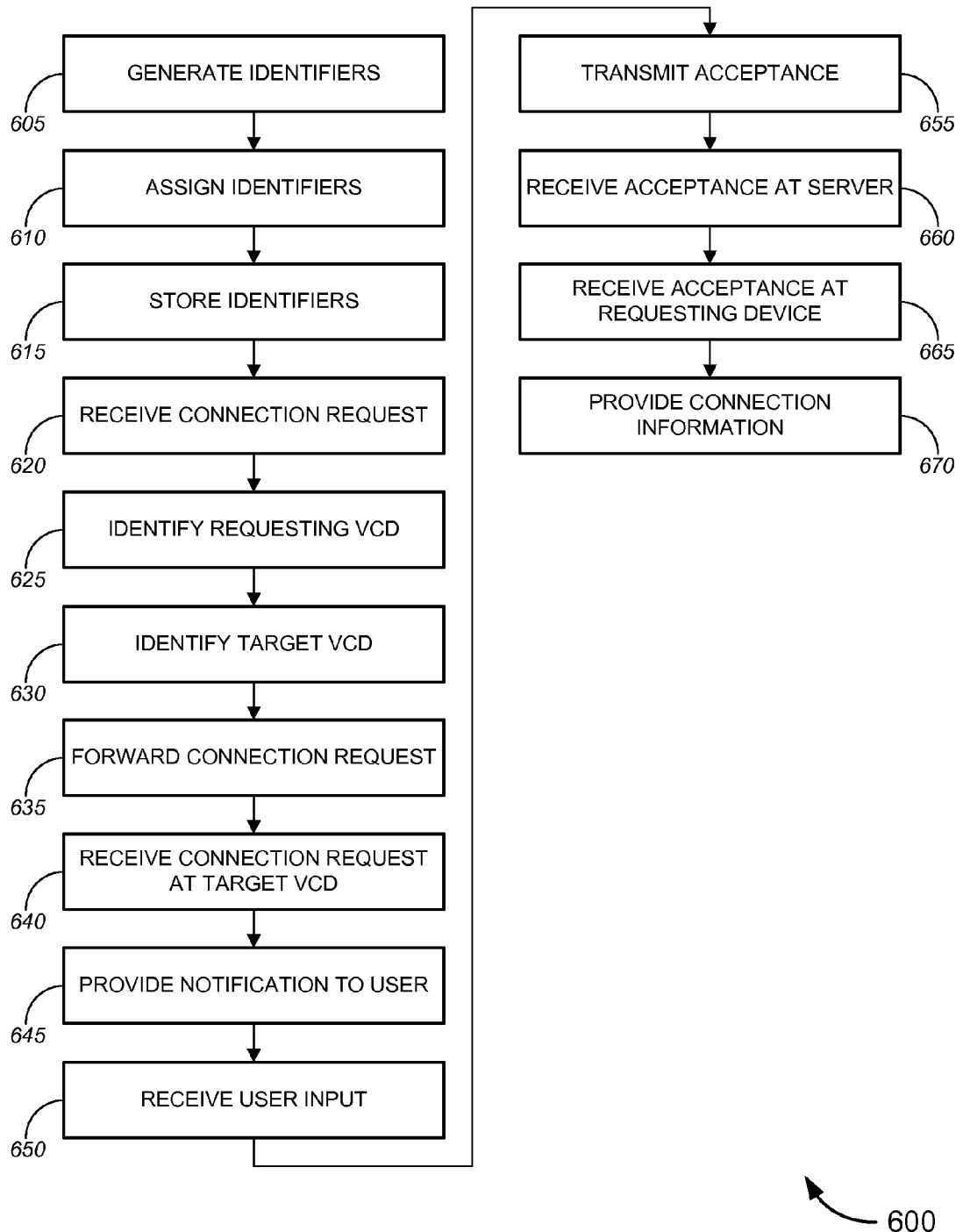
FIG. 6 is a process flow diagram illustrating a method of setting up a video call, in accordance with various embodiments.

FIG. 6 is a process flow diagram illustrating a method 600 of setting up a connection between two video communication devices, in accordance with various embodiments. The method 600 employs a communication server, such as the communication server 205 described with respect to FIG. 2, to facilitate user identification and call setup tasks. In other embodiments, however, call setup might be performed without the assistance from a communication server.

The method 600, in one embodiment, comprises generating a set of identifiers at a communication server computer system (block 605). (Alternatively and/or additionally, in some cases, identifiers may be pre-assigned to video communication devices during manufacturing, upon sale, and/or the like.) In particular, the method comprises generating a first identifier corresponding to a first video communication device, which is associated with (e.g., operated by, owned by, etc.) a first user, and a second identifier corresponding to a second video communication device that is associated with a second user. Identifiers may be generated in batch, and allocated to various video communication devices when needed, or they may be generated on demand (e.g., when a new video communication device attempts to register with the system). In an aspect, as noted above, each identifier is chosen from a sparse set, to enhance security and privacy.

At block 610, the communication server assigns the first identifier to the first video communication device and the second identifier to the second video communication device. The assignment of an identifier to a video communication device may occur during manufacturing, or at the time of sale, when a user registers the device or signs up for video calling service, at the request of the user for a new identifier, and/or the like. (While this document describes the identifiers as identifying a video communication device and/or as being assigned to a video communication device, such description also includes embodiments in which an identifier is assigned to a user associated with a particular video communication device and/or the identifier identifies such a user. In other words, in certain embodiments, the video communication device and the user can be considered interchangeable from an identification/authentication standpoint.)

The generated and/or assigned identifiers may be stored at the communication server (block 615). In many embodiments, and/or the video communication device stores its own identifier (which may be received at the device through user input, by transmission from the communication server, etc.). In an aspect, in addition to storing the identifier for the video communication device, the communication server might also store additional information about the video communication device and/or the user thereof. Such information can include, without limitation, addressing information for the video communication device (e.g., an IP address, including an external address of a firewall behind which the video communication device is situated), biographical and/or demographic information about the user (e.g., name, address and/or approximate location, and/or any other information the user elects to share).

At block 620, the communication server receives a connection request from one of the video communication devices (referred to herein as the "requesting video communication device"). The connection request might comprise the identifier assigned to that video communication device (or some other identifying information, such as a MAC address, etc.). The communication request typically will reference a second video communication device (described herein as a "target" video communication device) with which the user of the request would like to establish a connection. In some cases, this reference might include the identifier of the target video communication device. In other cases, however, the request might comprise other information sufficient to identify the target video communication device (e.g., a name and approximate location, etc.). In a particular set of embodiments, the communication server might provide a list of users (each of whom may have consented to inclusion on such a list) to the requesting video communication device, and the communication request might comprise a selection (made by user input at the requesting video communication device) from that list. The connection request optionally may include a media clip (e.g., a video clip, an audio clip, a photo, etc.) provided by the user of the requesting video communication device. A requesting user may wish to include such a clip in order to assist the user of the target video communication device in identifying the requesting user.

The communication server identifies the requesting video communication device, based at least in part on the identifier (or other identifying information) provided by the requesting video communication device (block 625) and identifies the target video communication device, based at least in part on the information in the request (block 630). Once the target video communication device has been identified, the communication server transmits to the target video communication device, sufficient information to allow the user of the target video communication device to identify the requesting user (block 635). In some cases, the communication server might simply forward the communication request that originated from the requesting video communication device (along with any accompanying media clips or other information), and the request might serve as the information transmitted to the target video communication device. In other embodiments, the communication might transmit a message of a different format. Either option is acceptable, so long as the target video communication device receives sufficient information to identify the requesting user.

When the connection request (or other information) is received at the target video communication device (block 640), the target video communication device provides a notification to the user of that video communication device that another user has requested a connection (block 645). If the connection request included a media clip, the notification to the user might include that media clip as well. Merely by way of example, the video communication device might cause an attached display device to display the notification, along with any accompanying media clip. If the user of the target video communication device is unavailable when the connection request is received, the target video communication device might cache the request for later notification of the user, and/or might notify the communication server that the user is unavailable, in which case the requesting user and/or the communication server can retransmit the request at a later time.

In some embodiments, along with the notification, the target video communication device might provide the user with an interface to provide input either accepting the connection request, rejecting the connection request, or seeking more information from or about the requesting user. The user's input in response to the request may be received by the target video communication device (block 650), e.g., as input from a remote control, and the user's stated preference may be stored at the video communication device. If the user has accepted the request, the video communication device might further store the identifier of the requesting video communication device in a contact list, to facilitate future video calls. In some cases, the target video communication device will transmit the user's response for reception by the communication server and/or the requesting video communication device (block 655).

In embodiments in which the user's response is transmitted to the communication server, the server may, upon receiving an acceptance of a communication request (block 660), create an association between the requesting video communication device (or user) and the target video communication device (or user) in a database managed by the communication server. The server may also forward the response to the requesting video communication device. (In other embodiments, however, the target video communication device might transmit the response directly to the requesting video communication device.) Upon receiving an acceptance response (block 665), whether from the communication server or the target video communication device, the requesting video communication device might add the user of the target video communication device to a contact list.

At block 670, the communication server provides at least one of the video communication devices with connection information sufficient to allow the video communication devices to establish a peer-to-peer communication session. This information may be provided to both video communication devices (e.g., upon acceptance of the connection request by the target video communication device), may be provided to the target video communication device along with the connection request itself, and/or may be provided at a later time (for example, when one of the video communication devices attempts to initiate a video call with the other video communication device). This connection information typically includes the identifier of one or both devices, which when coupled with NAT punch-through information available to the server, typically is sufficient to locate and connect with a device, but might additionally and/or alternatively include an IP address of one or both of the video communication devices (which might be an external IP address for a firewall that protects a video communication device through NAT). In many cases, this information may be sufficient to enable a peer-to-peer connection over the Internet. In other cases, the connection information may comprise sufficient information to allow the video communication devices to establish a peer-to-peer communication session over a CDN. Such information can include, for example, routing information, authentication and/or authorization credentials for the CDN, and/or the like.

Figure 7:
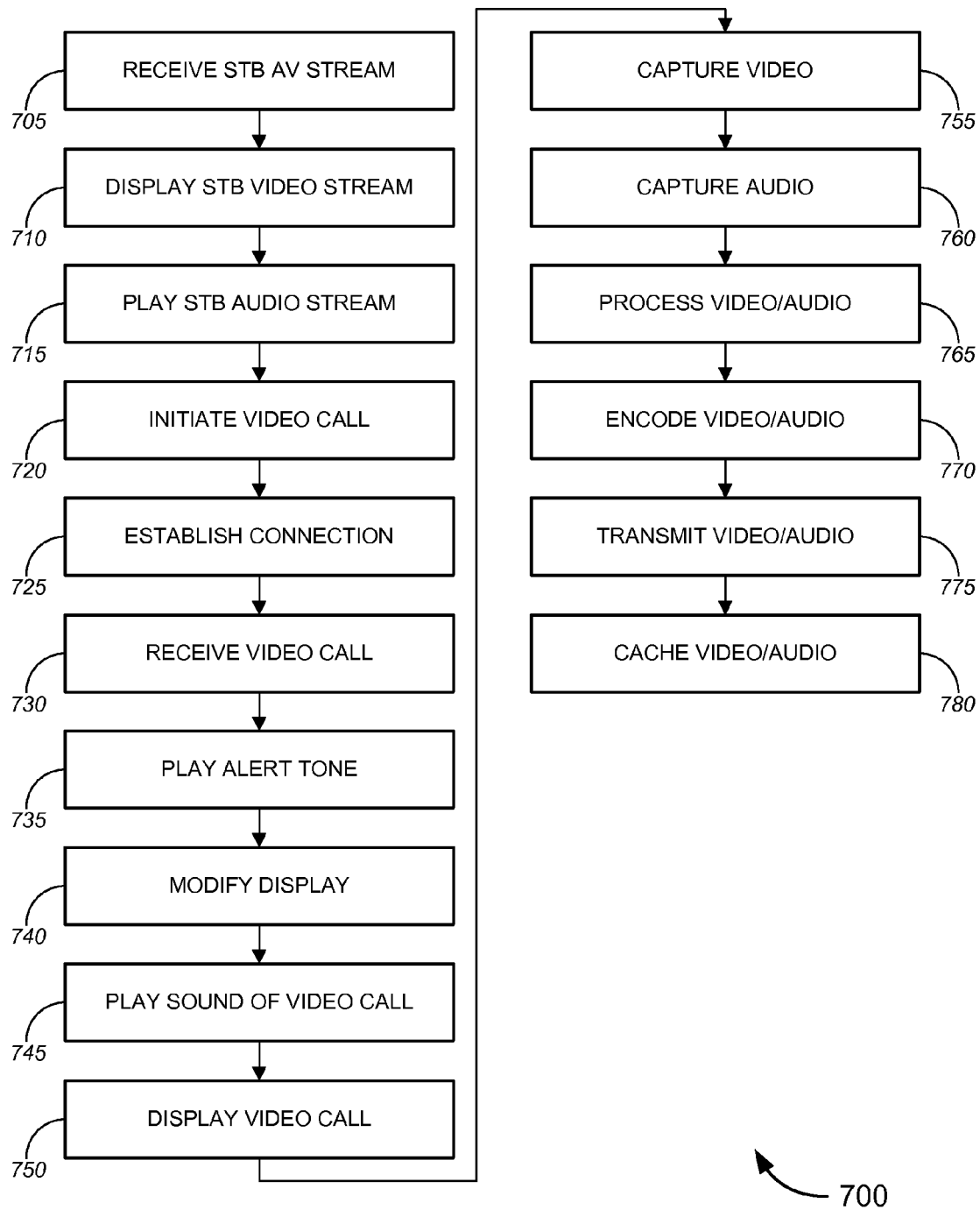
FIG. 7 is a process flow diagram illustrating a method of providing video calling services, in accordance with various embodiments.

FIG. 7 is a process flow diagram illustrating a method of providing video calling services, in accordance with various embodiments. The method 700 comprises receiving a STB audiovisual stream (which can include a STB audio stream and/or a STB video stream) at a local video communication device (block 705). (In conjunction with the method 700 of FIG. 7, the term "local video communication device" is used to describe the user's own video communication device from the user's perspective, while the term "remote video communication device" is used to describe the video communication device that is the other party to a video call with the local video communication device. In this example, the remote video communication device initiates the video call, but it should be appreciated that the local video communication device could initiate the video call, in which case the operations ascribed to each video communication device in this example would be reversed.) In an aspect, the STB stream might comprise a high-definition (e.g., 720p, 1080i. etc.) audiovisual stream. Typically, the STB stream will be provided by a STB, and/or received on an input audiovisual interface (and/or separate input audio interface and input video interface). As noted above, the STB stream may comprise a television program and/or other audiovisual content provided by a cable or satellite television operator.

The method further includes displaying the STB video stream with the display device (block 710) and/or playing the STB audio stream with an external audio receiver (which may be incorporated within the display device). The video communication device enables these operations by transmitting an output audiovisual stream (and/or individual output audio and video streams) on an output interface. At this point, the output streams may essentially comprise their respective STB streams. In other words, the user is watching television in normal fashion, and the operation of the video communication device is unobtrusive in this state.

At block 720, a remote video communication device initiates a video call with the local video communication device. Assuming, for purposes of this example, that the remote video communication device is a video communication device as described above, the user on the remote video communication device will initiate the call via a user interface on that user's display device. (It should be noted, however, that the process might be similar from the perspective of the local video communication device irrespective of the nature of the remote video communication device; as noted above, video communication devices in accordance with various embodiments can interoperate with a wide variety of different types of video calling systems.) Assuming, as well, that any necessary connection request had been transmitted and accepted, the remote video communication device will might initiate the call through a transmission to a communication server requesting connection information for the local video communication device, unless the remote video communication device had received the connection information earlier from the communication server.

The remote video communication device then attempts to establish a connection with the local video communication device (block 725). In a set of embodiments, a communication server participates in the call setup. In some cases, the communication server might simply provide connection information to the remote video communication device; in other cases, the communication server might contact the local video communication device on behalf of the remote video communication device, establish communication with both video communication devices, and then hand-off the communication to a peer-to-peer session between the two video communication devices. In still further embodiments, the video call might be routed through the communication server for the entirety of the video call. If communication server does not handle the entirety of the video call, however, the connection between the two video communication devices may be a peer-to-peer communication session over the Internet and/or a peer-to-peer communication session over a CDN.

When the local video communication device detects that it is receiving an incoming video call (block 730), the video communication device might play an alert tone (block 735), similar to the way a standard telephone rings upon receiving an incoming call, giving the user a chance to enable (e.g., power on) the display device if it is not already enabled. Alternatively, the user might elect to merely participate in the audio portion of the call, or decline to answer the call. On the other hand, if the display device is enabled when the incoming call is received, the video communication device might modify the video displayed on the display device (block 740), e.g., by modifying the STB video stream prior to transmitting the output video stream for reception by the display device. The modified video stream, for example, might include a notification window notifying the user of the incoming call and providing the user with options (which can be selected with the remote control) for accepting and/or rejecting the incoming call.

If the user is not available or chooses not to answer the call, the local video communication device might allow the remote video communication device to leave a video and/or audio message. This message can be cached on the local video communication device and replayed later for the user. (If the local video communication device itself is unavailable, i.e., if the remote video communication device cannot establish a connection with the local video communication device, the remote video communication device might cache a message, e.g., a video and/or audio message, for transmission when the local video communication device becomes available.)

Assuming the user elects to accept the incoming call, the video communication device will begin participating in the video call. When participating in a video call, a video communication device typically will receive, depacketize, and decode a remote audiovisual stream (comprising a remote audio stream and a remote video stream) and/or separate remote audio and video streams that it receives from the remote video communication device.

The video communication device will then transmit, on an output audio interface, an output audio stream. This output audio stream might be a consolidated output audio stream, which comprises at least the decoded remote audio stream. (As noted below, the consolidated output audio stream might also comprise audio from the STB audio stream.) This audio output can be received by an external audio receiver (which, again, may be incorporated in a display device, such as a HDTV) and played for the user (block 745), to allow the user to hear the other participant in the video call. In other cases, the video communication device might play the audio output through the video communication device's own speaker, especially if the external audio receiver is not enabled to play the audio (as described further below.)

Similarly, the video communication device may transmit the decoded and/or processed remote video stream on the output video interface. Like the audio output, the output video stream might be a consolidated output video stream (described below) that may comprise at least a portion of the remote video stream and/or at least a portion of the STB video stream. The display device (e.g., HDTV) then can display for the user a video portion of the video call (block 750).

Of course, to enable an interactive video call, the local video communication device generally will transmit an audiovisual stream of the local user for reception by the remote video communication device. Hence, the processor of the video communication device might control the video capture device to capture a captured video stream (block 755) and/or control the audio capture device to capture an audio stream (block 760). Typically, the user might be a subject of these captured streams. The captured streams may be processed as needed (e.g., to correct white balance of the video stream, to cancel echo in the audio stream, etc.) (block 765) and encoded and/or packetized to produce a series of data packets for transmission over the Internet (and/or a CDN) to the remote video communication device (block 770). This series of packets then may be transmitted on the network interface for reception by the remote video communication device (e.g., over the established peer-to-peer communication session between the two video communication devices) (block 780).

In some cases, the local video communication device may cache the captured audio/video streams on a storage device local to the local video communication device, prior to transmission (either before or after packetization) (block 780). Merely by way of example, in some cases, the video communication device might be used to capture audio and video for a message, rather than for a real-time video call, especially if a connection with the remote video communication device is not presently available. In such cases, the captured streams may be cached until a connection with the remote video communication device becomes available, at which point they may be transmitted. Alternatively and/or additionally, the captured streams may be transmitted to the communication server and cached on a storage medium local to the communication server, which would then transmit the cached streams when the remote video communication device becomes available. In other situations, the video and/or audio streams might be cached and/or buffered temporarily prior to transmission during a video call, for example to accommodate transient network issues.

One potential issue encountered by a television-based video calling system is how to address a situation in which a video call is received while the television is powered off and/or otherwise not enabled to notify the user of the incoming call. Certain embodiments provide for this situation by including a speaker in the video communication device; this speaker can provide notification (and/or at least audio calling services) in the event a television (or external audio receiver) is unavailable for some reason. In such embodiments, however, it may be undesirable for the video communication device's own speaker to be active if audio output from the television/external audio receiver is enabled as well. Moreover, forcing the user to manually control operation of the speaker may be problematic. For example, if the user forgets to enable the speaker powering off the television, incoming calls may be missed. At the very least, requiring manual control of the speaker may inconvenience the user.

Figure 8:
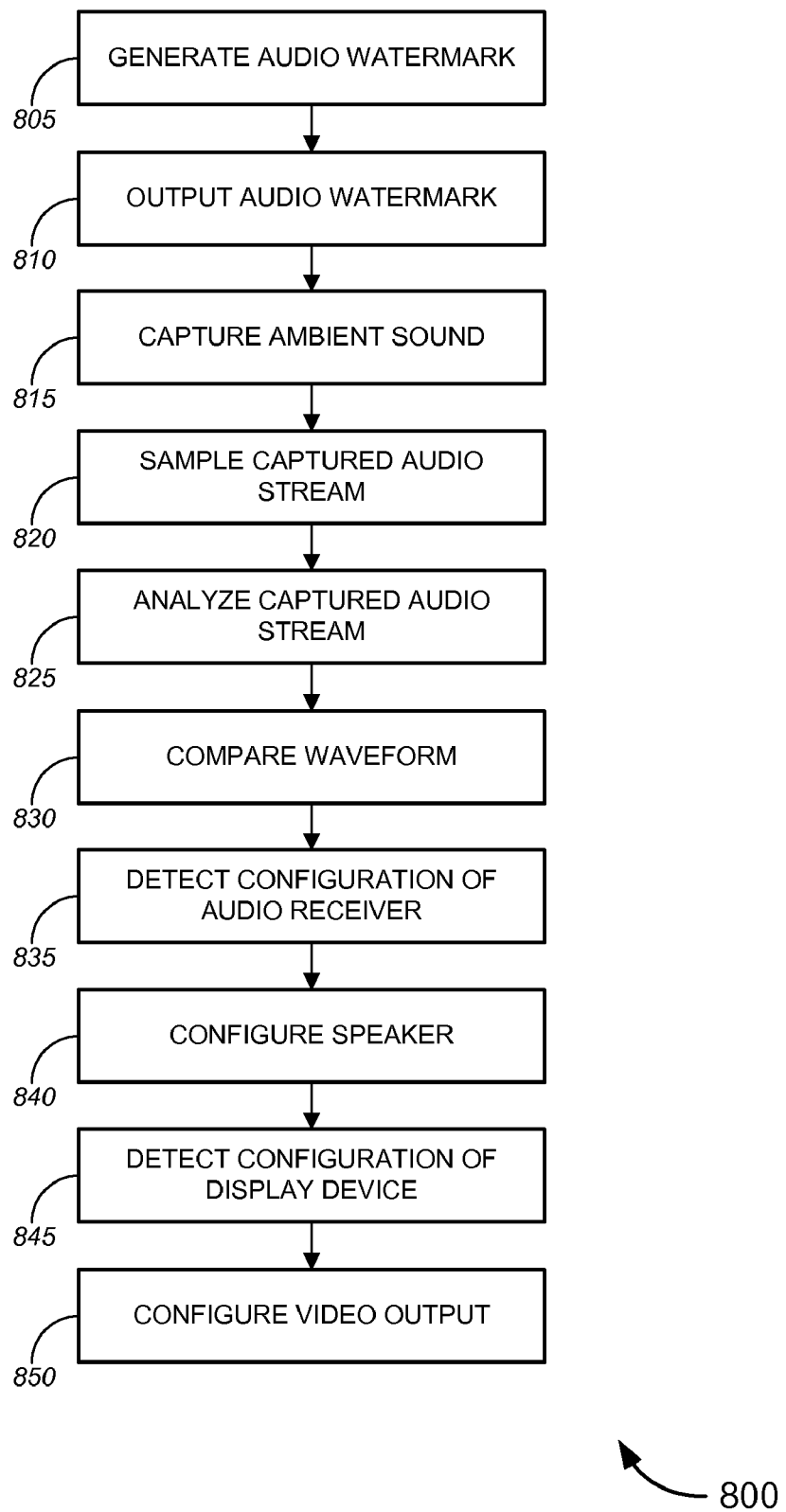
FIG. 8 is a process flow diagram illustrating a method of controlling audio and video output from a video communication device, in accordance with various embodiments.

FIG. 8, therefore, is a process flow diagram illustrating a method 800 of controlling audio and/or video output from a video communication device, in accordance with various embodiments. In particular, the method 800 of FIG. 8 can be used to control operation of a video communication device's internal speaker based on a determination whether an external device is enabled to play audio output from the video communication device.

The method 800 comprises generating an audio watermark at the video communication device (block 805). In an aspect, the audio watermark has a known waveform. In certain embodiments this waveform may be selected to be easily recognizable to the video communication device but inaudible (or at least unobtrusive) to the human ear. The method 800 further comprises inserting this audio watermark into an output audio stream and transmitting the output audio stream on one or more of the output audio interfaces for reception by an external audio receiver (block 810). The watermark may be inserted periodically on an appropriate interval and/or may be a continuous waveform inserted into the output audio stream.

If the audio receiver is enabled and/or configured to play audio output from the video communication device, it will play the output audio stream (including the inserted watermark). Accordingly, the method 800 further comprises capturing ambient sound with the audio capture device (block 820). The video communication device samples a signal of the captured audio stream (block 820) and analyzes the sampled signal to detect the presence of the watermark (block 825). In one aspect, analyzing the sampled signal comprises comparing the sampled signal with a static waveform that corresponds to the known waveform inserted into the output audio stream.

By determining whether the watermark can be identified in the captured audio stream (i.e., whether the comparison results in a match), the video communication device can detect whether the audio receiver is configured and/or enabled to play audio output from the video communication device (block 835). Based (at least in part) on whether the audio receiver is configured/enabled to play the audio output, the video communication device can adjust its audio output configuration (block 840), for example by controlling operation of the video communication device's own speaker to enable the speaker if the audio receiver is not enabled and/or by disabling the speaker if the audio receiver is configured to play the audio output.

In somewhat similar fashion, the video communication device may be configured to detect whether the video display device is configured to display the output video stream. Merely by way of example, if certain video output interfaces (such as an HDMI interface) are used to connect the display device with the video communication device, the video communication device may be able to receive configuration information about the display device (e.g., whether the display device is powered on, to which input the display devices is tuned, etc.) over the video output interface. Alternatively and/or additionally, the video communication device might infer a status of the display device based on the results of the audio watermark process described above.

The method 800, then, may comprise configuring the video communication device's video output based on the detected configuration of the display device (block 850). Merely by way of example, the video communication device might transmit the output video stream over the output video interface only if it determines that the display device is properly configured to display the stream. Alternatively and/or additionally, the video communication device might configure the television to display the output (e.g., via commands sent over a HDMI interface, through simulation of the display device's remote control, etc.)

One benefit provided by certain embodiments over conventional video calling solutions is the ability for a user to participate in a video call and watch television simultaneously. In an aspect, certain embodiments accomplish this feature by creating consolidated output audio and video streams. As used herein, a consolidated output stream means an output stream that includes at least a portion of the corresponding remote stream. In many (but not all) cases, the consolidated output stream will also include at least a portion of the corresponding STB stream and/or (especially in the case of video) at least a portion of the corresponding captured stream.

Figure 9:
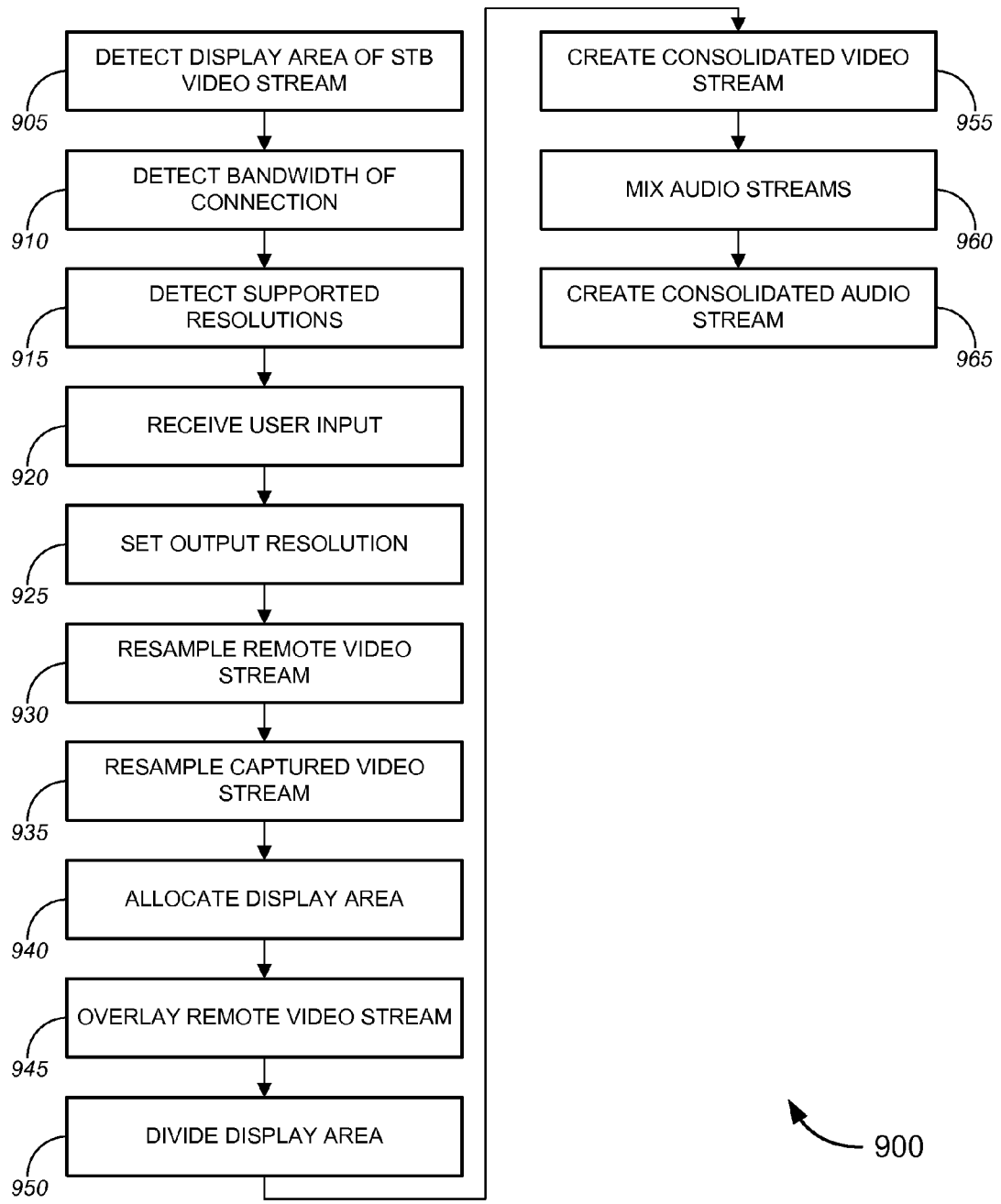
FIG. 9 is a process flow diagram illustrating a method of creating consolidated audio and video output streams, in accordance with various embodiments.

To that end, FIG. 9 is a process flow diagram illustrating a method 900 of creating consolidated audio and video output streams, in accordance with various embodiments. In an aspect, the process of generating a consolidated output video stream involves setting a resolution of that output signal. Various factors can be considered when setting the output resolution, including without limitation the resolution of each of the input sources, user preferences, and the like.

Accordingly, at block 905, the method 900 comprises detecting a display area of the STB video stream. In an aspect, the STB video stream has a display area comprising a plurality of pixels. This plurality of pixels defines the display resolution of the STB video signal (e.g. 1920 horizontal pixels× 1080 pixels for a 1080p signal). Typically, a high-definition video stream comprises information about its resolution, from which the display area can be determined. Alternatively, the resolution often can be determined from the characteristics of the video stream itself. For example, the video communication device might analyze the blanking interval size and/or sync information in the signal to determine the resolution.

The method might further comprise detecting the bandwidth of the connection between the local video communication device and the remote video communication device (block 910), as this bandwidth can constrain the available resolution of the remote video stream. Similarly, the capabilities of the display device can constrain the permissible resolution of the output video stream, so the method 900 may further comprise detecting a set of supported resolutions of the display device (block 915). Merely by way of example, depending on the connection between the video communication device and the display device, the video communication device might be able to receive information about supported resolutions via this connection (e.g., via a HDMI interface).

Additionally and/or alternatively, the user might desire a certain output resolution, so the method 900, at block 920, might comprise receiving user input (e.g., via the user interface displayed on the display device). In some cases, the user might select an output resolution that the display device cannot accommodate, which can cause the display device to display a blank screen. This problem can be avoided in situations in which the video communication device can detect the supported resolutions of the display device, but this capability may not always be present. Accordingly, in some embodiments, the video communication device allows the user to toggle the output resolution using a remote control, for example by pressing a designated key for a certain duration. In this way, a user can "escape" a situation in which the user has selected an unsupported output resolution, rendering the display device unable to display a menu that would allow the user to change the resolution in the usual manner.

Based on some or all of these factors (depending on the embodiment), the video communication device sets the resolution of the output video stream (block 925).

Depending on the selected output resolution, the video communication device might resample the remote video stream (block 930), e.g., to upsample the remote video stream to a resolution that is compatible with the output resolution. Similarly, if the captured video stream is to be included in the output video stream (e.g., so that the user can view an inset window showing what the other caller sees on the video call), the captured video stream might be resampled in similar fashion (block 940).

There are a variety of ways in which the STB video stream, the remote video stream, and/or the captured video stream can be combined to produce the output video stream. For example, in one embodiment, the method 900 comprises allocating at least a portion of the plurality of pixels in the STB video stream for displaying at least a portion of the remote video stream, at least a portion of the captured video stream, and/or for menus or other elements of the video communication device user interface (block 940).

In some cases, allocating the plurality of pixels might comprise overlaying a portion of the remote video stream, at least a portion of the captured video stream, and/or one or more elements of the user interface over at least a portion of the STB video stream (block 945). This overlay procedure can be used, for example, to create a picture in picture effect, in which the remote video stream is displayed as a window inset into the STB video stream. The overlay procedure can also be used to generate transparent (or translucent) menus or other user interface elements that appear to float on top of the STB video stream.

Depending on the application, a different level of transparency may be desired. For example, with a translucent menu, it may be aesthetically pleasing for the user to see some of the television program (from the STB video stream) "bleed through" the menu, so a relatively high level of transparency may be desirable. On the other hand, if one video stream is overlaid over another video stream, such transparency can be distracting or confusing for the user. Accordingly, the transparency of the overlaid video can be controlled through the use of an α parameter, which specifies, on a pixel-by-pixel basis for the overlay area, the proportion of the output video stream that displays the overlay and the proportion that displays the underlying video stream. This relationship may be expressed as $$\text{Output}[i][j] = (\alpha[i][j]) * \text{Underlying Stream}[i][j] + (1-\alpha[i][j]) * \text{Overlay}[i][j] \quad \text{(Eq. 1)}$$

Where [i][j] represents the horizontal and vertical position of the pixel in question, and which an α of 0 specifies that the overlay is opaque, and an α value of 1 specifies that the overlay is completely transparent (invisible).

Another option for allocating the display area is to divide the display area into multiple regions or portions to produce a "split-screen" display, which can provide a number of configurations, including without limitation splitting the screen in half horizontally and/or vertically, splitting the screen into unequal regions, and/or splitting the screen into a larger "frame" with a smaller inset "window." Merely by way of example, in one possible configuration the STB video stream is displayed on one half of the display screen and in which the other have of the display screen is split between the remote video stream and the captured video stream. The pixels for each region therefore are allocated to the respective stream. If necessary, any of the video streams can be scaled, down-sampled, and/or cropped to fit into the allocated display area.

In some cases, the user can be given the option to specify an allocation scheme, which controls how the display area is divided among various video stream, and/or how various streams are overlaid. The user interface, for example, might present a menu of several available options to the user, and the user can provide user input (e.g., using the remote control) to select a desired allocation scheme. This allocation scheme is then use to allocate the available display area.

The method 900, then, may further comprise creating a consolidated output video stream from one or more of the video streams, and/or transmitting the consolidated output video stream on the output video interface. In an aspect, the consolidated output video stream comprises at least a portion of the remote video stream. In some embodiments, the consolidated output video stream might further comprise at least a portion of the STB video stream and/or at least a portion of the captured video stream.

In some cases, the timing of the arriving frames makes generating the consolidated output video stream difficult. For example, while frames of the STB video stream generally will arrive at a regular interval, the frames of the remote STB video stream may not, due to network latency, jitter, and/or the like. One solution to this issue is to is to employ an interframe interval for the consolidated output video stream that is equal to the interframe interval of the STB video stream. In other words, the video communication device might generate a blended frame whenever there is a STB video frame available. Using this mechanism, one technique is to use "best-effort" on the remote video frames. That is, whenever it is time to generate a blended frame, the video communication device uses the most up to date remote video frame and does not wait for frames if they happen to arrive late.

In addition to mixing video streams, certain embodiments also mix audio streams (block 960), for example, to allow the user to hear both the audio from the STB and the audio from the remote video communication device. In one aspect, the audio mixing may be performed to correspond to the selected display area allocation scheme. Merely by way of example, if the screen is split in half vertically with the remote video stream displayed on the left half of the screen and the STB video stream displayed on the right half of the screen, the video communication device might mix the audio by outputting the STB audio stream through the right channel (in a stereo configuration) and outputting the remote audio stream through the left channel. As another example, both channels might output both audio streams, but the relative volumes of the streams might correspond to the relative sizes of the display regions allocated to each respective video stream.

In an aspect, the mixing of the audio streams is specified by an audio $\alpha$ value, which can be expressed in this way:

$$\text{Output} = \alpha * STB \text{ audio stream} + (1-\alpha) * \text{remote audio stream} \quad \text{(Eq. 2)}$$

In which an $\alpha$ of 0 specifies that the mixed audio output consists entirely of the remote audio stream, and in which an $\alpha$ value of 1 specifies that the mixed audio output consists entirely of the STB audio stream. (Hence, in an embodiment, the "mixed" audio stream might either consist entirely of the remote audio stream, consist entirely of the STB audio stream, or might comprise both audio streams, in specified proportions.) In a set of embodiments, then, the method 900 further comprises creating a consolidated output audio stream (block 965) by mixing the remote audio stream and the STB audio stream and/or transmitting the consolidated output audio stream on the output audio interface.

One novel feature of certain embodiments is to provide electronic control of the field of view of the video capture device. In particular, the user of the remote video communication device can be given the ability to control the video capture device of the local video communication device, and vice-versa. (In similar fashion, of course, a user may be able to control the field of view of his own video capture device.) While professional teleconferencing systems sometimes employ mechanically-actuated cameras, consumer-grade solutions typically employ a web cam having a fixed focus and without any ability to pan or tilt mechanically. While the user of the web cam might be able to adjust the field of view of the camera manually (by physically moving the camera), this is of little benefit to the remote user, who is the principal consumer of the captured video. Essentially, if the camera's field of view is unsatisfactory, the remote user must either ask the local user to re-aim the camera or tolerate a suboptimal video calling experience.

By contrast, certain embodiments allow the remote user to control the field of view (e.g., using a remote control of the remote video communication device). In an aspect, one set of embodiments provides this ability by overprovisioning the video capture device in the local video communication device. In other words, the video capture device might employ a sensor with a higher resolution than is required. Hence a portion of the video capture device's field of view can be set as the effective field of view of the video capture device, for purpose of capturing the captured video stream.

Figure 10:
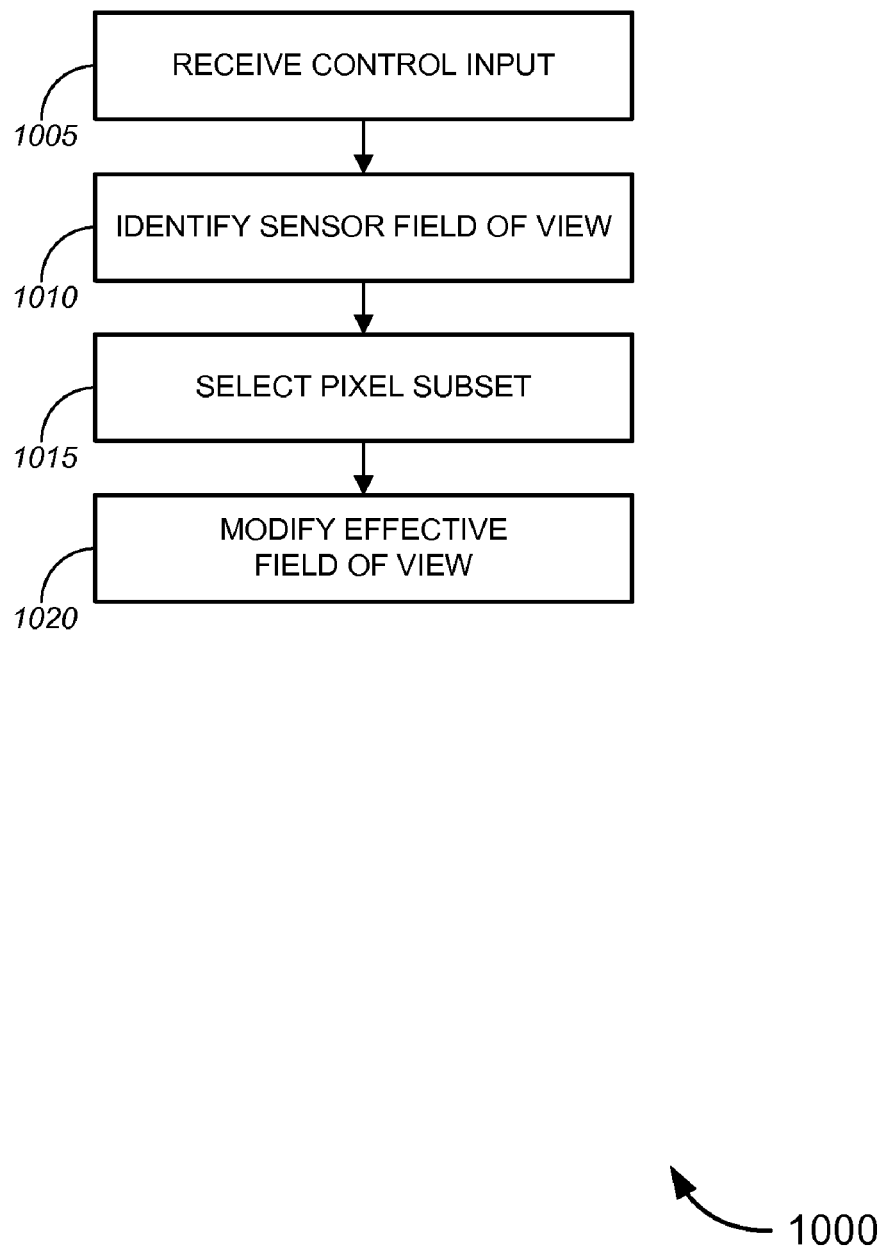
FIG. 10 is a process flow diagram illustrating a method of modifying an effective field of view of a camera in a video communication system, in accordance with various embodiments.
Figure 11:
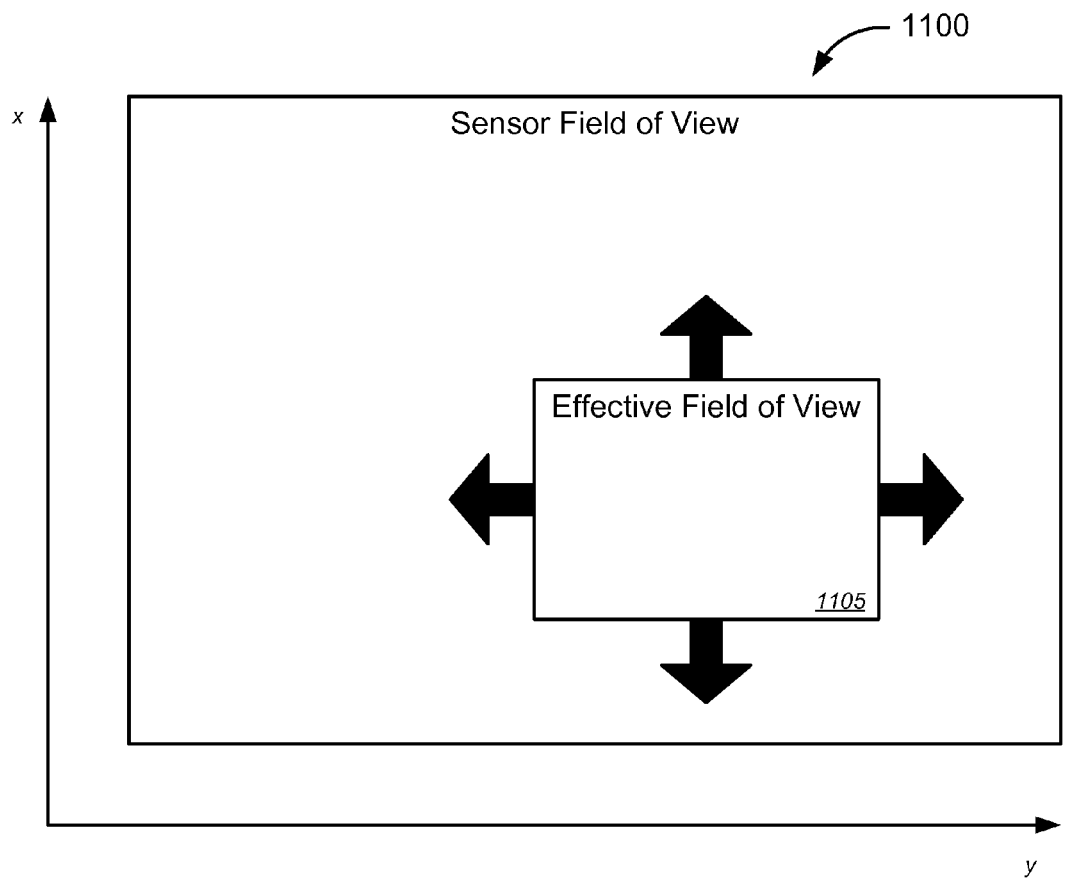
FIG. 11 illustrates an effective field of view of a camera in a video communication system, in accordance with various embodiments.

FIG. 10 is a process flow diagram illustrating a method 1000 that provides this functionality. At block 1005, the local video communication device receives control input from the remote video communication device (and/or directly via user input from the local user). This control input might comprise, for example, commands to zoom the video capture device, pan the video capture device horizontally in one direction or the other, or pan the video camera vertically in one direction or the other. At block 1010, the local video communication device identifies a field of view of a sensor of the video capture device. The sensor has a native resolution that comprises a set of pixels (similar to the display resolutions described above). Referring to FIG. 11, the sensor's field of view 1100 corresponds to this native resolution. The local video communication device then, selects a subset of this set of pixels to serve as the effective field of view 1105 of the video capture device. By reducing the number of pixels in the subset, the local video communication device can reduce the effective field of view, thereby electronically "zooming" the video capture device in on the subject. Similarly, by progressively selecting subsets of pixels to the left (from the perspective of the sensor) of the current effective field of view, the local video communication device can electronically "pan" the video capture device from right to left. Similar operations can be used to electronically "pan" the video capture device up, down, and/or from left to right. Hence, by selecting an appropriate pixel subset, the local video communication device can modify the effective field of view of the video capture device (block 1020), in response to the input received from the local user and/or the remote video communication device.

In another set of embodiments, the video communication device can be configured to detect content in the STB audiovisual stream. This functionality can be used to enable many beneficial features. Merely by way of example, a local video communication device might communicate information about the content in the STB stream to a remote STB, allowing for automated coordination of the STB audiovisual streams received by each video communication device, enabling the participants in the video call to watch television "together." Additionally and/or alternatively, this functionality can be used to compile statistics on the user's viewing habits, enabling the video communication device (and/or another computer system, such as the communication server) to make suggestions for content that might also interest the user and/or to provide targeted advertising.

Figure 12:
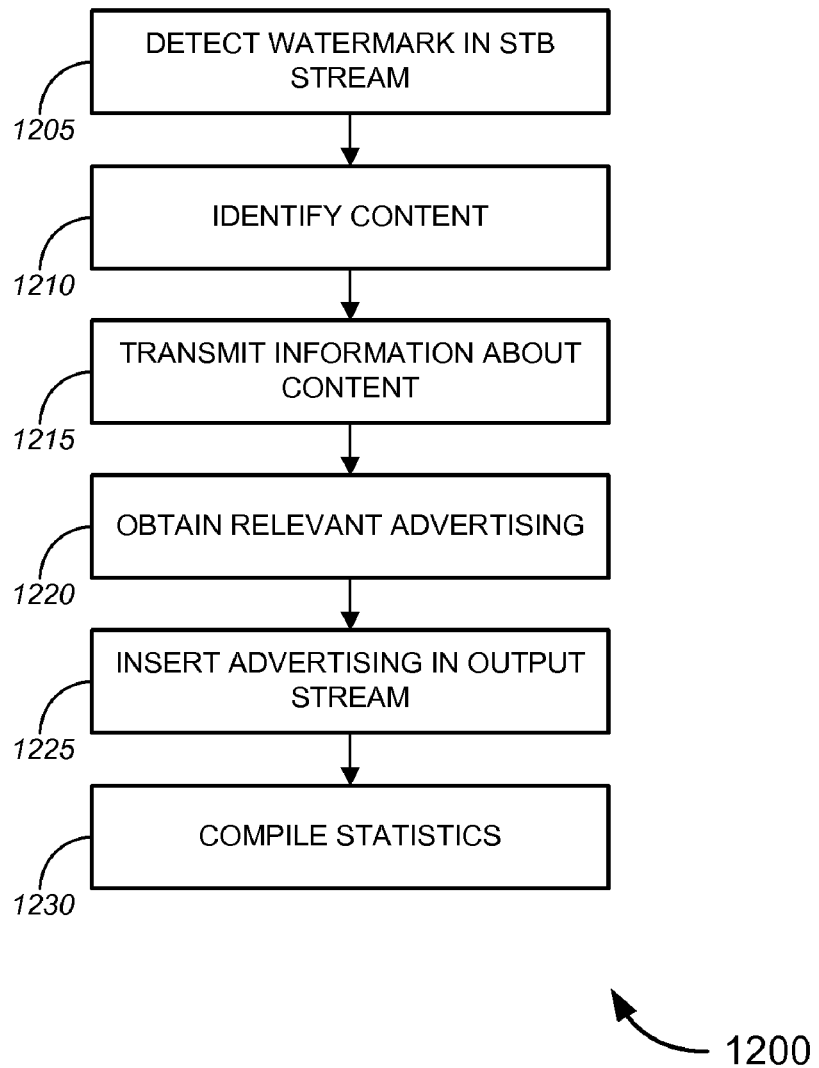
FIG. 12 illustrates a method of identifying audiovisual content, in accordance with various embodiments.

Accordingly, FIG. 12 illustrates a method 1200 of identifying audiovisual content, in accordance with various embodiments. At block 1205, the method comprises detecting a watermark in the STB audiovisual stream (this watermark, which is typically inserted by a broadcaster and is present in the STB audiovisual stream received by the video communication device, is distinct from the watermark used to detect the configuration of the audio receiver, as described above). In some cases, this watermark may be present in the STB video stream, either as a visible image, such as a network logo in the picture or as an invisible and/or inconspicuous artifact). In other cases, the watermark may be present in the STB audio stream. In either case, the watermark may be used by the video communication device to identify content in the STB audiovisual stream (block 1210), either based on information inherent in the watermark or by providing a reference which the video communication device can use to look up an identity of the content.

At block 1215, the method 1200 comprises transmitting information about the identified content via the network interface. In some cases, this information may be transmitted for reception by a remote video communication device, for example to enable coordinated television viewing. In other cases, this information may be transmitted to the communication server and/or to another server on the Internet. For example, the information may be transmitted so that the server can identify relevant advertising, based on the identified content. Hence, the method 1200 can comprise obtain relevant advertising, e.g., by receiving it from the communication server and/or another server (block 1220). This advertising content can be inserted into the STB audiovisual stream at an appropriate time (block 1225), using techniques similar to those described above with respect to creating a consolidated output audio and/or video stream. In other embodiments, the method 1200 may comprise compiling statistics regarding viewing preferences of a user of the video communication device, based at least in part on the identified content (block 1230). Statistics can be compiled locally at the video communication device and/or transmitted to a server for aggregation. These statistics can be used, for example, to generate an anonymized demographic profile based on viewing preferences of multiple users, to enable suggestions for similar content that the user might enjoy, to identify relevant advertising, and/or the like.

Figure 13:
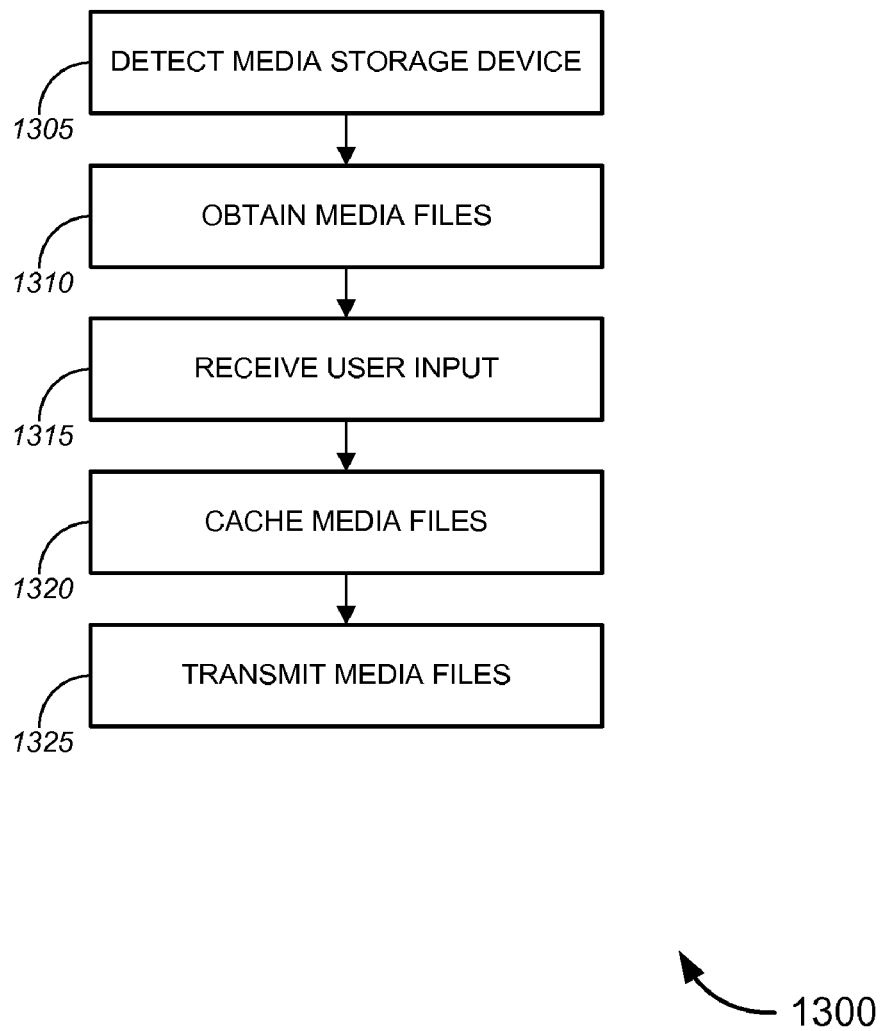
FIG. 13 illustrates a method of storing and/or sharing multimedia using a video communication system, in accordance with various embodiments.

In addition and/or alternatively to providing video calling capabilities, some embodiments can serve as a media hub, to allow the centralized storage and/or sharing of various media files (e.g., photos, audio clips, video clips, etc.). FIG. 13 illustrates a method 1300 of storing and/or sharing multimedia using a video communication system, in accordance with various embodiments. The method 1300 comprises, at block 1305, detecting a media storage device in communication with a data interface (e.g., a USB interface). Virtually any media storage device that is capable of communicating with the data interface can be supported. Examples include, without limitation, as a camera (video or still), audio player, personal digital assistant, hard drive, flash drive, and/or the like. In some embodiments, the method further comprises obtaining, from the media storage device, one or more media files (block 1310).

In some cases, the method further comprises receiving user input (block 1315). The user input might specify which files the user would like to upload and/or share, might specify a destination for the files, and/or the like. Alternatively, in some embodiments, the method 1300 might be performed automatically, without user interaction (other than physically connecting the media storage device).

In an aspect of some embodiments, the media files might be cached locally at the video communication device (block 1320), either for persistent storage, or as a buffering technique to allow the media files to be transmitted over a period of time. At block 1325, then, the method 1300 comprises transmitting the media files via the network interface for storage at another device. In some cases, the other device might be the communication server (and/or a storage device maintained by the communication server), another file storage and/or sharing server, and/or another video communication device, among other possibilities.

Figure 14:
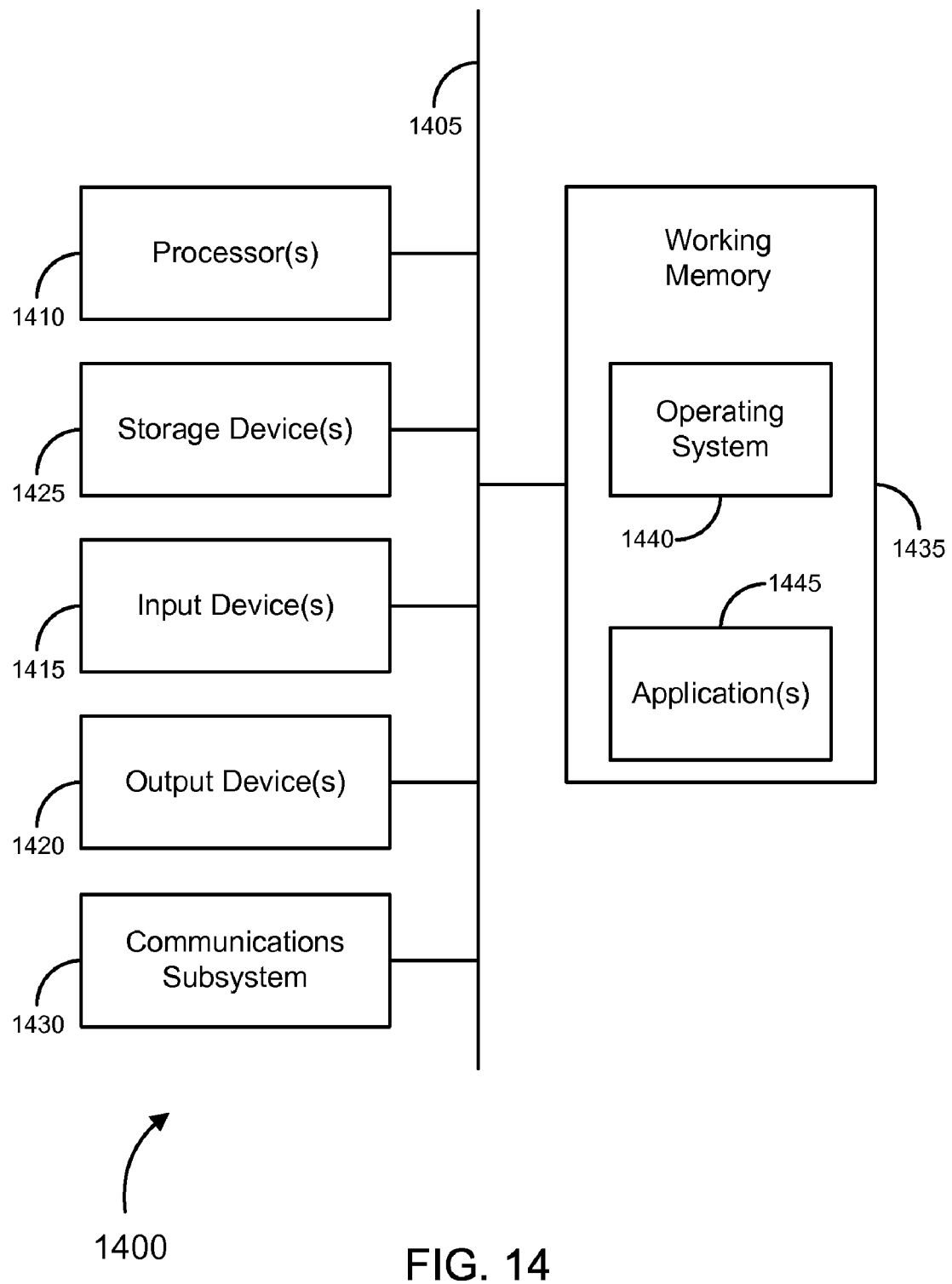
FIG. 14 is a generalized schematic diagram illustrating a computer system, in accordance with various embodiments.

FIG. 14 provides a schematic illustration of one embodiment of a computer system 1400 that can perform the methods provided by various other embodiments, as described herein, can provide processing functionality for a video communication device, and/or can serve as a communication server, in accordance with various embodiments. It should be noted that FIG. 14 is meant only to provide a generalized illustration of various components, of which one or more (or none) of each may be utilized as appropriate. FIG. 14, therefore, broadly illustrates how individual system elements may be implemented in a relatively separated or relatively more integrated manner.

The computer system 1400 is shown comprising hardware elements that can be electrically coupled via a bus 1405 (or may otherwise be in communication, as appropriate). The hardware elements may include one or more processors 1410, including without limitation one or more general-purpose processors and/or one or more special-purpose processors (such as digital signal processing chips, graphics acceleration processors, and/or the like); one or more input devices 1415, which can include without limitation a mouse, a remote control, a keyboard and/or the like; and one or more output devices 1420, which can include without limitation a display device and/or the like.

The computer system 1400 may further include (and/or be in communication with) one or more storage devices 1425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1400 might also include a communications subsystem 1430, which can include without limitation a modem, a network card (wireless or wired), an infra-red communication device, a wireless communication device and/or chipset (such as a Bluetooth™ device, an IEEE 802.11 device, a WiFi device, a WiMax device, a WWAN device, cellular communication facilities, etc.), and/or the like. The communications subsystem 1430 may permit data to be exchanged with and/or over a network (such as the network described below, to name one example), with other computer systems and/or video communication devices, and/or with any other devices described herein. In many embodiments, the computer system 1400 will further comprise a working memory 1435, which can include a RAM or ROM device, as described above.

The computer system 1400 also may comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a computer readable storage medium, such as the storage device(s) 1425 described above. In some cases, the storage medium might be incorporated within a computer system, such as the system 1400. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1400) to perform methods in accordance with various embodiments of the invention. According to a set of embodiments, some or all of the procedures of such methods might be performed by the computer system 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another computer readable medium, such as one or more of the storage device(s) 1425. Merely by way of example, execution of the sequences of instructions contained in the working memory 1435 might cause the processor(s) 1410 to perform one or more procedures of the methods described herein.

The terms "machine readable medium" and "computer readable medium," as used herein, refer to any medium that participates in providing data that causes a machine to operation in a specific fashion. In an embodiment implemented using the computer system 1400, various computer readable media might be involved in providing instructions/code to processor(s) 1410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 1425. Volatile media includes, without limitation, dynamic memory, such as the working memory 1435. Transmission media includes, without limitation, coaxial cables, copper wire and fiber optics, including the wires that comprise the bus 1405, as well as the various components of the communication subsystem 1430 (and/or the media by which the communications subsystem 1430 provides communication with other devices). Hence, transmission media can also take the form of waves (including without limitation radio, acoustic and/or light waves, such as those generated during radio-wave and infra-red data communications).

Common forms of physical and/or tangible computer readable media (i.e., storage media) include, for example, a floppy disk, a flexible disk, a hard disk, magnetic tape, or any other magnetic medium, a CD-ROM, any other optical medium, a RAM (e.g., dynamic RAM, flash RAM, etc.) a PROM, and EPROM, a FLASH-EPROM, any other memory chip or cartridge, or any other medium from which a computer can read instructions and/or code.

Various forms of computer readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400. These signals, which might be in the form of electromagnetic signals, acoustic signals, optical signals and/or the like, are all examples of carrier waves on which instructions can be encoded, in accordance with various embodiments of the invention.

The communications subsystem 1430 (and/or components thereof) generally will receive the signals, and the bus 1405 then might carry the signals (and/or the data, instructions, etc. carried by the signals) to the working memory 1435, from which the processor(s) 1405 retrieves and executes the instructions. The instructions received by the working memory 1435 may optionally be stored on a storage device 1425 either before or after execution by the processor(s) 1410.

Figure 15:
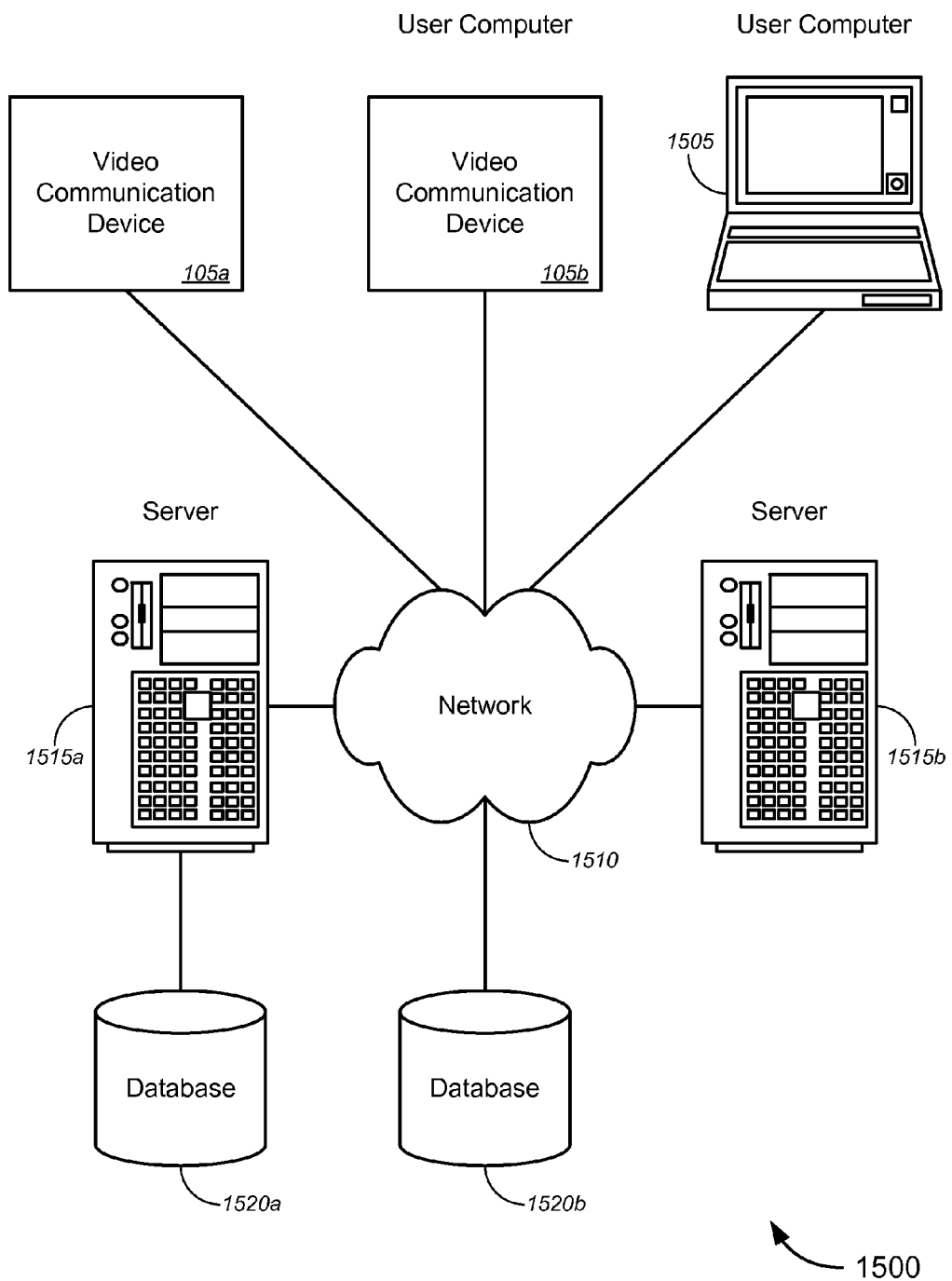
FIG. 15 is a block diagram illustrating a networked system of devices, which can be used in accordance with various embodiments.

A set of embodiments comprises video communication systems. While specific examples of such systems are described in detail above, FIG. 15 illustrates in generic fashion various components of a networked system 1500 that can be employed as a video communication system. The system 1500 can include video communication devices 105 and/or one or more user computers 1505 (which might, for example, be programmed with a video chat application configured to participate in a video call with a video communication device 105). A user computer 1505 can be a general purpose personal computer (including, merely by way of example, personal computers and/or laptop computers running any appropriate flavor of Microsoft Corp.'s Windows™ and/or Apple Corp.'s Macintosh™ operating systems) and/or a workstation computer running any of a variety of commercially-available UNIX™ or UNIX-like operating systems. A user computer 1505 can also have any of a variety of applications, including one or more applications configured to perform methods provided by various embodiments (as described above, for example), as well as one or more office applications, database client and/or server applications, and/or web browser applications. Alternatively, a user computer 1505 can be any other electronic device, such as a thin-client computer, Internet-enabled mobile telephone, and/or personal digital assistant, capable of communicating via a network (e.g., the network 1510 described below) and/or displaying and navigating web pages or other types of electronic documents. Although the exemplary system 1500 is shown with three user computers 1505, any number of user computers can be supported.

Certain embodiments operate in a networked environment, which can include a network 1510. The network 1510 can be any type of network familiar to those skilled in the art that can support data communications using any of a variety of commercially-available (and/or free or proprietary) protocols, including without limitation TCP/IP, SNA, IPX, AppleTalk, and the like. Merely by way of example, the network 1510 can include a local area network ("LAN"), including without limitation a WLAN including without limitation a network operating under any of the IEEE 802.11 suite of protocols, the Bluetooth™ protocol known in the art, and/or any other wireless protocol), an Ethernet network, a Token-Ring network and/or the like; a wide-area network; a wireless wide area network ("WWAN"); a virtual network, such as a virtual private network ("VPN"); the Internet; an intranet; an extranet; a public switched telephone network ("PSTN"); a private CDN; and/or any combination of these and/or other networks.

Embodiments can also include one or more server computers 1515. Each of the server computers 1515 may be configured with an operating system, including without limitation any of those discussed above, as well as any commercially (or freely) available server operating systems. Each of the servers 1515 may also be running one or more applications, which can be configured to provide services to one or more clients 105, 1505 and/or other servers 1515. In a particular aspect, a server 1515 may be programmed to act as a communication server, in the manner described above, for example.

In some cases, one of the servers 1515 may be a web server, which can be used, merely by way of example, to process requests for web pages or other electronic documents from user computers 1505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1505 to perform methods of the invention.

The server computers 1515, in some embodiments, might include one or more application servers, which can be configured with one or more applications accessible by a client running on one or more of the client computers 1505 and/or other servers 1515. Merely by way of example, the server(s) 1515 can be one or more general purpose computers capable of executing programs or scripts in response to the user computers 1505 and/or other servers 1515, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle, Microsoft, Sybase™, IBM™ and the like, which can process requests from clients (including, depending on the configuration, dedicated database clients, API clients, web browsers, etc.) running on a user computer 1505 and/or another server 1515. It should be noted that the functions described with respect to various servers herein can be performed by a single server and/or a plurality of specialized servers, depending on implementation-specific needs and parameters.

In certain embodiments, the system can include one or more databases 1520. The location of the database(s) 1520 is discretionary: merely by way of example, a database 1520a might reside on a storage medium local to (and/or resident in) a server 1515a. Alternatively, a database 1520b can be remote from any or all of the servers 1515, so long as it can be in communication (e.g., via the network 1510) with one or more of these. In a particular set of embodiments, a database 1520 can reside in a storage-area network ("SAN") familiar to those skilled in the art. In some cases, a database 1520 may be used to store data for performing operations in accordance with various embodiments. Such data can include, without limitation, video communication device identifiers, addresses and/or other connection information, files and/or other media provided by users, and/or the like (some or all of such data could also be stored outside of a database, such as in the file system of a server)

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for real-time, high-definition video communication, the system comprising:
a first video communication device; and
a second video communication device in communication with the first video communication device over the Internet;
wherein the first video communication device comprises:
a high-definition multimedia ("HDMI") input interface configured to receive high-definition audiovisual input from a set-top box;
an HDMI output interface configured to provide high-definition audiovisual output for display on a high-definition television;
a speaker to provide audible output;
a wireless network interface in communication with a wireless local area network to provide communication with the second video communication device over the Internet;
one or more microphones to capture audio input from a user of the first video communication device;
a high-definition video camera to capture a video stream of the user;
at least one processor; and
a storage medium in communication with the at least one processor, the storage medium having encoded thereon a set of instructions executable by the at least one processor to control operation of the first video communication device, the set of instructions comprising:
instructions for receiving, via the wireless network interface, a connection request from a communication server on the Internet, the connection request originating from the second video communication device;
instructions for notifying the user of the communication request;
instructions for receiving user input accepting the connection request;
instructions for receiving a video call over a peer-to-peer Internet communication session with the second video communication device, via the wireless network interface;
instructions for transmitting an audio watermark signal through the HDMI output interface;
instructions for determining whether a speaker of the high-definition television is powered on and enabled to play audio output from the first video communication device, based on reception of the audio watermark signal through at least one of the one or more microphones;
instructions for receiving a high-definition set-top box audiovisual stream from the set-top box, wherein set-top box audiovisual stream comprises a set-top box video stream and a set-top box audio stream, the set-top box video stream having a display area comprising a plurality of pixels, the plurality of pixels defining a display resolution of the set-top box video stream;
instructions for receiving a remote audiovisual stream from the second video communication device over the wireless network interface, wherein the remote audiovisual stream comprises a remote video stream and a remote audio stream;
instructions for detecting the display resolution of set-top box video stream;
instructions for setting a display resolution of the remote video stream, based at least in part on one or more factors selected from the group consisting of the detected display resolution of the set-top box video stream, a bandwidth of a connection between the first video communication device and the second video communication device, and a user-specified setting;
instructions for modifying the set-top box video stream, in response to receiving the video call;
instructions for allocating at least a portion of the display area of the set-top box video stream, comprising at least some of the plurality of pixels, for displaying at least a portion of the remote video stream, to produce a consolidated high-definition output video stream comprising at least a portion of the remote video stream;
instructions for transmitting the consolidated high-definition output video stream on the HDMI output interface, for display on the high-definition television;
instructions for producing a consolidated audio output stream comprising at least the remote audio stream;
instructions for transmitting the consolidated audio output stream on the HDMI output interface, based on a determination that the speaker of the high-definition television is powered on and enabled to play audio output from the first video communication device;
instructions for controlling the camera to capture a captured video stream;
instructions for controlling the one or more microphones to capture a captured audio stream;
instructions for canceling echo in the captured audio stream;
instructions for encoding the captured video stream and the captured audio stream as a series of packets for transmission over the Internet; and
instructions for transmitting the series of packets over the peer-to-peer communication session.

2. The system of claim 1, wherein the set of instructions further comprises:
instructions for modifying a field of view of the camera, based on commands received from the second video communication device.

3. The system of claim 2, wherein the instructions for modifying an effective field of view of the camera comprise instructions for performing one or more operations selected from the group consisting of vertically panning the effective field of view, horizontally panning the effective field of view, and zooming the effective field of view.

4. The system of claim 1, wherein the connection request comprises a video clip, and wherein the instructions for notifying the user of the connection request comprise instructions for providing a notification comprising the video clip.

5. The system of claim 1, wherein the connection request comprises an audio clip, and wherein the instructions for notifying the user of the connection request comprise instructions for providing a notification comprising the audio clip.

6. A video communication system, comprising:
a first video communication device, comprising:
a video input interface to receive video input from a set-top box;
an audio input interface to receive audio input from the set-top box;

a video output interface to provide video output to a video display device;

an audio output interface to provide audio output to an audio receiver;

a video capture device to capture video;

an audio capture device to capture audio;

a network interface;

at least one processor; and a storage medium in communication with the at least one processor, the storage medium having encoded thereon a set of instructions executable by the at least one processor to control operation of the first video communication device, the set of instructions comprising:

instructions for controlling the video capture device to capture a captured video stream;

instructions for controlling the audio capture device to capture a captured audio stream;

instructions for encoding the captured video stream and the captured audio stream to produce a series of data packets; and instructions for transmitting the series of data packets on the network interface for reception by a second video communication device.

7. The video communication system of claim 6, further comprising a remote control, wherein the first video communication device further comprises a remote control receiver.

8. The video communication system of claim 6, wherein the at least one processor is a plurality of processors comprising a first processor to process the captured video stream and a second processor to process a remote video stream received from the second video communication device.

9. The video communication system of claim 6, wherein the set-top box comprises the first video communication device.

10. The video communication system of claim 6, wherein the video display device comprises the video communication device.

11. The video communication system of claim 6, wherein the video communication device is incorporated within the set-top box.

12. The video communication system of claim 6, wherein the network interface comprises a wireless local area network ("WLAN") interface.

13. The video communication system of claim 6, wherein the video input interface comprises a high-definition multimedia interface ("HDMI") to receive high-definition video input from the set-top box.

14. The video communication system of claim 6, wherein the video input interface comprises the audio input interface.

15. The video communication system of claim 6, wherein the video output interface comprises a high-definition multimedia interface ("HDMI") to provide a high-definition output video stream to a high-definition television.

16. The video communication system of claim 6, wherein the video output interface comprises the audio output interface.

17. The video communication system of claim 6, wherein the video display device comprises the audio receiver.

18. The video communication system of claim 6, wherein the video display device is a high-definition television.

19. The video communication system of claim 6, wherein the video capture device comprises a high-definition camera.

20. The video communication system of claim 6, wherein the audio capture device comprises a microphone array comprising at least two microphones.

21. The video communication system of claim 6, wherein the second video communication device is a personal computer programmed with a video chat application.

22. The video communication system of claim 6, wherein instructions for transmitting the series of data packets comprise instructions for transmitting the series of data packets over the Internet.

23. The video communication system of claim 6, wherein instructions for transmitting the series of data packets comprise instructions for transmitting the series of data packets over a private content delivery network.

24. The video communication system of claim 6, wherein the video input interface receives a set-top box video stream, and wherein the network interface receives a remote audiovisual stream from the second video communication device, the remote audiovisual stream comprising a remote video stream and a remote audio stream.

25. The video communication system of claim 24, wherein the set of instructions further comprises:

instructions for creating a consolidated output video stream comprising at least a portion of the remote video stream.

26. The video communication system of claim 25, wherein the consolidated output video stream further comprises at least a portion of the captured video stream.

27. The video communication system of claim 25, wherein the consolidated output video stream further comprises a user interface of the first video communication device.

28. The video communication system of claim 25, wherein the consolidated output video stream further comprises at least a portion of the set-top box video stream.

29. The video communication system of claim 28, wherein the set-top box video stream has a display area comprising a plurality of pixels, the plurality of pixels defining a display resolution of the set-top box video stream, and wherein the instructions for creating a consolidated output video stream comprise:

instructions for allocating at least a portion of the display area, comprising at least some of the plurality of pixels, for displaying at least a portion of the remote video stream.

30. The video communication system of claim 29, wherein the instructions for allocating at least a portion of the display area comprise:

instructions for overlaying at least a portion of the remote video stream over at least a portion of the set-top box video stream, using a specified video a value to control an apparent transparency of the at least a portion of the remote video stream.

31. The video communication system of claim 29, wherein the instructions for allocating at least a portion of the display area comprise:

instructions for allocating a first portion of the display area for displaying at least a portion of the set-top box video stream; and instructions for allocating a second portion of the display area for displaying at least a portion of the remote video stream.

32. The video communication system of claim 31, wherein the set of instructions further comprises:

instructions for receiving user input specifying an allocation scheme, wherein the first portion of the display area and the second portion of the display area are defined by the allocation scheme.

33. The video communication system of claim 29, wherein the instructions for allocating at least a portion of the display area comprise:
  instructions for detecting the display resolution of the set-top box video stream.

34. The video communication system of claim 33, wherein the set of instructions further comprises:
  instructions for setting a resolution of the consolidated output video stream as a function of the input video stream.

35. The video communication system of claim 25, wherein the set of instructions further comprises:
  instructions for setting a resolution of the consolidated output video stream based at least in part on a bandwidth of a connection between the first video communication device and the second video communication device.

36. The video communication system of claim 25, wherein the set of instructions further comprises:
  instructions for setting a resolution of the consolidated output video stream based at least in part on a user-specified setting.

37. The video communication system of claim 25, wherein the set of instructions further comprises:
  instructions for resampling a resolution of the remote video stream to accommodate the resolution of the set-top box video stream.

38. The video communication system of claim 6, wherein the network interface receives a remote audio stream from the second video communication device.

39. The video communication system of claim 38, wherein the set of instructions further comprises:
  instructions for mixing the remote audio stream with a set-top box audio stream received via the audio input interface, using a specified audio a value to create a consolidated output audio stream.

40. The video communication system of claim 39, wherein the specified audio a value falls between 0 and 1, in which a specified audio a value of 0 specifies that the consolidated output audio stream consists entirely of the remote audio stream and a specified audio a value of 1 specifies that the consolidated output audio stream consists entirely of the set-top box audio stream.

41. The video communication system of claim 6, wherein the first video communication device further comprises a speaker to play the audio output.

42. The video communication system of claim 41, wherein the audio receiver is external to first video communication device, and wherein the set of instructions further comprises:
  instructions for detecting whether the audio receiver is configured to play the audio output.

43. The video communication system of claim 42, wherein the set of instructions further comprises:
  instructions for controlling operation of the speaker based at least in part on whether the audio receiver is configured to play the output.

44. The video communication system of claim 42, wherein the instructions for detecting whether the audio receiver is capable of playing the audio output comprise:
  instructions for inserting an audio watermark in the audio output; and
  instructions for analyzing the captured audio stream to identify the audio watermark.

45. The video communication system of claim 44, wherein the audio watermark has a known waveform, and wherein the instructions for analyzing the captured audio stream comprise:
  instructions for sampling a signal of the captured audio stream; and
  instructions for comparing the sampled signal with a static waveform corresponding to the known waveform of the audio watermark.

46. The video communication system of claim 41, the set of instructions further comprising:
  instructions for detecting whether the video display device is configured to display the output video; and
  instructions for transmitting the output video over the output video interface based on a determination that the video display device is configured to display the output video stream.

47. The video communication system of claim 6, wherein the network interface receives control input from the second video communication device, the set of instructions further comprising:
  instructions for modifying an effective field of view of the camera, based on the control input.

48. The video communication system of claim 47, wherein the instructions for modifying an effective field of view of the camera comprise instructions for performing one or more operations selected from the group consisting of vertically panning the effective field of view, horizontally panning the effective field of view, and zooming the effective field of view.

49. The video communication system of claim 47, wherein the camera has a native resolution comprising a first set of pixels and the effective field of view comprises a second set of pixels, the second set of pixels being a subset of the first set of pixels, and wherein the instructions for modifying an effective field of view of the camera comprise:
  instructions for selecting the second set of pixels from within the first set of pixels, in response to the control input;
  instructions for generating the captured video stream from the selected second set of pixels.

50. The video communication system of claim 6, wherein the instructions for encoding the captured video stream comprise instructions for processing the captured video stream prior to encoding the captured video stream.

51. The video communication system of claim 6, wherein the instructions for encoding the captured audio stream comprise instructions for processing the captured audio stream prior to encoding the captured video stream.

52. The video communication system of claim 6, wherein video communication device receives a set-top box audiovisual stream from the set-top box, the audiovisual stream comprising an audio stream received via the audio input interface and a video stream received via the video input interface.

53. The video communication system of claim 52, wherein the set-top box audiovisual stream comprises a broadcast television program.

54. The video communication system of claim 52, wherein the set of instructions further comprises:
  instructions for detecting a watermark in the set-top box audiovisual stream; and
  instructions for identifying content in the set-top box audiovisual stream, based at least in part on the detected watermark.

55. The video communication system of claim 54, wherein the watermark comprises a video watermark in the set-top box video stream.

56. The video communication system of claim 54, wherein the watermark comprises an audio watermark in the set-top box audio stream.

57. The video communication system of claim 54, wherein the set of instructions further comprises:
instructions for transmitting information about the identified content via the network interface.

58. The video communication system of claim 57, wherein the instructions for transmitting information about the identified content comprise instructions for transmitting the information for reception by the second video communication device.

59. The video communication system of claim 54, wherein the set of instructions further comprises:
instructions for obtaining relevant advertising, based on the identified content in the set-top box audiovisual stream; and
instructions for inserting the relevant advertising into an output video stream provided via the video output interface.

60. The video communication system of claim 54, wherein the set of instructions further comprises:
instructions for compiling statistics regarding viewing preferences of a user of the first video communication device, based at least in part on the identified content in the set-top box audiovisual stream.

61. The video communication system of claim 6, the set of instructions further comprising:
instructions for caching the captured video stream and the captured audio stream on a storage device if a connection with the second video communication device is unavailable.

62. The video communication system of claim 61, wherein the storage device is local to the first video communication device.

63. The video communication system of claim 62, the set of instructions further comprising:
instructions for transmitting the captured audio stream and the captured video stream via the network interface after a communication session has been established with the second video communication device.

64. The video communication system of claim 61, wherein the storage device is local to a communication server remote from the first video communication device.

65. The video communication system of claim 6, wherein the first video communication device further comprises a data interface, and wherein the instructions further comprise:
instructions for detecting a media storage device in communication with the data interface;
instructions for obtaining one or more media files from the media storage device;
instructions for caching the one or more media files at first video communication device; and
instructions for transmitting the one or more media files via the network interface for storage at an other device.

66. The video communication system of claim 65, wherein the other device is a communication server remote from the first video communication device.

67. The video communication system of claim 65, wherein the other device is the second video communication device.

68. The video communication system of claim 65, wherein the media storage device is selected from the group consisting of a flash memory device, a still camera, a video camera, a digital music player, a wireless phone, and a handheld computer.

69. A method of providing video calling using a first video communication device comprising an audio capture device, a video capture device, a network interface, an audiovisual input interface, and an audiovisual output interface, the method comprising:
receiving, on the audiovisual input interface, a set-top box audiovisual stream from a set-top box, the set-top box audiovisual stream comprising a set-top box video stream and a set-top box audio stream;
receiving, on the network interface, a remote audiovisual stream via a network connection with a second video communication device, the remote audiovisual stream comprising a remote audio stream and a remote video stream;
transmitting, on the audiovisual output interface, a consolidated output video stream comprising at least a portion of the remote video stream and a consolidated output audio stream comprising at least the remote audio stream;
capturing a captured video stream with the video capture device;
capturing a captured audio stream with the audio capture device;
encoding the captured video stream and the captured audio stream to produce a series of data packets; and
transmitting the series of data packets on the network interface for reception by the second video communication device.

70. The method of claim 69, wherein the audiovisual input interface comprises an audio input interface and a video input interface, wherein receiving the set-top box audiovisual stream comprises receiving the set-top box audio stream on the audio input interface, and wherein receiving the set-top box video stream comprises receiving the set-top box video stream on the video input interface.

71. The method of claim 69, wherein the audiovisual output interface comprises an audio output interface and a video output interface, wherein transmitting the consolidated output audio stream comprises transmitting the consolidated output audio output stream on the audio output interface, and wherein transmitting the consolidated output video stream comprises transmitting the consolidated output video stream on the video output interface.

72. The method of claim 69, wherein the audiovisual input interface is a high-definition multimedia interface ("HDMI").

73. The method of claim 69, wherein the audiovisual output interface is a high-definition multimedia interface ("HDMI").

74. The method of claim 69, wherein the network interface is a wireless local area network ("WLAN") interface.

75. A method of providing real-time video communication services, the method comprising:
generating, at a communication server computer system, a sparse set of identifiers, the sparse set of identifiers comprising a first identifier corresponding to a first video communication device associated with a first user and a second identifier corresponding to a second video communication device associated with a second user;
storing, at the communication server computer system, the sparse set of identifiers;
receiving, at the communication server system, a connection request from the first video communication device, the connection request referencing a second video communication device, the connection request comprising the first identifier and sufficient information to identify the second video communication device;
identifying the first video communication device at the communication server computer system, based at least in part on the first identifier;
identifying the second video communication device at the communication server computer system, based at least in part on the information in the request;

transmitting, for reception by the second video communication device, information sufficient to allow the second user to identify the first user;

providing, from the communication server computer system to at least one of the video communication devices, connection information sufficient to allow the first video communication device and the second video communication device to establish a peer-to-peer communication session.

76. The method of claim 75, further comprising:
receiving, at the communication server computer system, an acceptance of the connection request;
wherein the connection information is provided based on receiving the acceptance of the connection request.

77. The method of claim 75, wherein the information in the connection request comprises a second identifier corresponding to the second video communication device.

78. The method of claim 75, wherein the connection request comprises a video clip of the first user, and wherein the information sufficient to allow the second user to identify the first user comprises the video clip.

79. The method of claim 75, wherein the connection request comprises an audio clip of the first user, and wherein the information sufficient to allow the second user to identify the first user comprises the audio clip.

80. The method of claim 75, wherein the connection information is sufficient to allow the first video communication device and the second video communication device to establish a peer-to-peer communication session over the Internet.

81. The method of claim 75, wherein the connection information is sufficient to allow the first video communication device and the second video communication device to establish a peer-to-peer communication session over a private content delivery network.

82. The video communication system of claim 6, wherein the set of instructions further comprises:
instructions for configuring the video display device to display the video output.

83. The video communication system of claim 82, wherein the set of instructions further comprises:
instructions for detecting whether the video display device is configured to display the video output;
wherein the instructions for configuring the video display device to display the video output comprise instructions for configuring the video display device to display the video output, based at least in part on detecting that the video display device is not configured to display the video output.

84. The video communication system of claim 83, wherein the instructions for detecting whether the video display device is configured to display the video output comprise instructions for receiving configuration information from the video display device via the video output interface.

85. The video communication system of claim 82, wherein the instructions for configuring the video display device to display the video output comprise:
instructions for transmitting a signal, via the video output interface, to configure the video display device.

86. The video communication system of claim 82, wherein the instructions for configuring the video display device to display the video output comprise:
instructions for transmitting a signal that simulates a remote control signal, which would be transmitted by a control device associated with the video display device, to configure the video display device.

* * * * *